US006813594B2

(12) United States Patent
Guertin et al.

(10) Patent No.: US 6,813,594 B2
(45) Date of Patent: Nov. 2, 2004

(54) AUTOMATIC DETERMINATION AND SELECTION OF BUILD PARAMETERS FOR SOLID FREEFORM FABRICATION TECHNIQUES BASED ON AUTOMATIC PART FEATURE RECOGNITION

(75) Inventors: Michelle D. Guertin, Salem, CT (US); Chris R. Manners, Moorpark, CA (US)

(73) Assignee: 3D Systems, Inc., Valencia, CA (US)

( * ) Notice: Subject to any disclaimer, the term of this patent is extended or adjusted under 35 U.S.C. 154(b) by 744 days.

(21) Appl. No.: 09/847,992

(22) Filed: May 3, 2001

(65) Prior Publication Data

US 2002/0188369 A1 Dec. 12, 2002

(51) Int. Cl.[7] .............................................. G06F 19/00
(52) U.S. Cl. .................. 703/6; 703/1; 703/2; 700/120; 700/119; 264/401; 264/40.1; 118/620
(58) Field of Search ..................... 703/2, 1, 6; 700/98, 700/119, 120, 182; 264/40.1, 401; 118/620

(56) References Cited

U.S. PATENT DOCUMENTS

| | | | |
|---|---|---|---|
| 5,059,021 A | * | 10/1991 | Spence et al. ............... 264/401 |
| 5,137,662 A | | 8/1992 | Hull et al. |
| 5,182,715 A | | 1/1993 | Vorgitch et al. |
| 5,184,307 A | | 2/1993 | Hull et al. |
| 5,209,878 A | | 5/1993 | Smalley et al. |
| 5,238,639 A | | 8/1993 | Vinson et al. |
| 5,321,622 A | | 6/1994 | Snead et al. |
| 5,345,391 A | | 9/1994 | Hull et al. |
| 5,597,520 A | | 1/1997 | Smalley et al. |
| 5,840,239 A | | 11/1998 | Partanen et al. |
| 5,902,537 A | | 5/1999 | Almquist et al. |
| 5,936,861 A | * | 8/1999 | Jang et al. .................... 700/98 |
| 5,943,235 A | * | 8/1999 | Earl et al. .................... 700/98 |
| 5,945,058 A | | 8/1999 | Manners et al. |
| 6,029,096 A | | 2/2000 | Manners et al. |
| 6,084,980 A | | 7/2000 | Nguyen et al. |
| 6,159,411 A | | 12/2000 | Kulkarni et al. |
| 6,165,406 A | * | 12/2000 | Jang et al. .................. 700/119 |
| 6,241,934 B1 | * | 6/2001 | Everett et al. .............. 700/120 |
| 6,270,335 B2 | * | 8/2001 | Leyden et al. .............. 425/375 |
| 6,325,961 B1 | * | 12/2001 | Beers et al. ................. 700/119 |
| 6,366,825 B1 | * | 4/2002 | Smalley et al. ............. 700/120 |
| 6,401,001 B1 | * | 6/2002 | Jang et al. .................. 700/120 |
| 6,532,394 B1 | * | 3/2003 | Earl et al. ................... 700/119 |
| 6,574,523 B1 | * | 6/2003 | Hanna et al. ............... 700/120 |

FOREIGN PATENT DOCUMENTS

WO WO 97/11837 4/1997

\* cited by examiner

Primary Examiner—W. D. Thomson
(74) Attorney, Agent, or Firm—James E. Curry; Ralph D'Alessandro

(57) ABSTRACT

A solid freeform fabrication method and apparatus for making objects in a layer by layer manner in which the objects have special geometrical features requiring specialized control parameters. The method and apparatus automatically determines and selects the build parameters for the build process based on automatic part feature recognition. A general build style is first determined having a plurality of default parameters for building the object. Data representing the object is imported and oriented with a Z-axis. The data is then processed by slicing software that automatically identifies special build types for specific ranges of Z-values and selects the alternative parameters needed to successfully build these features. Preferably a look-up table contains special sets of values for the parameters for each special build type possible in which the slicing algorithm can select from. During slicing, operator intervention is not needed to prepare all the parameters necessary for a successful build.

29 Claims, 10 Drawing Sheets

AUTOMATIC DETERMINATION AND SELECTION OF BUILD PARAMETERS FOR SOLID FREEFORM FABRICATION TECHNIQUES BASED ON AUTOMATIC PART FEATURE RECOGNITION

BACKGROUND OF THE INVENTION

1. Field of the Invention

The invention relates in general to algorithms for use in forming three-dimensional objects by solid freeform fabrication techniques such as stereolithography. In particular, the present invention relates to an improved algorithm capable of automatically detecting geometrical configurations of an object that require special build parameters and automatically selecting those parameters for a range of Z-values without intervention by the operator.

2. Description of the Prior Art

Many algorithms have been proposed previously to control the forming of a three-dimensional object in a layer by layer manner by solid freeform fabrication techniques. Some solid freeform fabrication techniques, herein referred to as SFF, include stereolithography, laminated object manufacturing, selective phase area deposition, multi-phase jet solidification, ballistic particle manufacturing, fused deposition modeling, particle deposition, laser sintering, and the like. One recent algorithm is disclosed in U.S. Pat. No. 6,159,411 to Kulkarni et al. wherein a style wizard determines a general build style for a three-dimensional object to be formed in response to answers to a series of questions by an operator. The objective of the algorithm is to simplify the selection process as much as possible in order to prevent or eliminate operator error in deriving build parameters for the three-dimensional object.

A three-dimensional object formed according to improperly selected build parameters often results in an unacceptable part. In stereolithography, sometimes the object collapses on itself during the build process or the recoater blade tears up sections of the object creating a plurality of strings of solidified material in the resin vat. Such failures not only waste operation time, but also create additional maintenance time, as the solidified material floating in the resin vat must be removed. Eliminating object collapses and failures is highly desirable.

Build failures not only occur due to the improper selection of a general build style for the three-dimensional object, but also due to failure to identify special geometric features on the object that may require unique parametric treatment prior to building. Generally, these special geometric features cannot be built successfully by the default values of general build style parameters and require special build parameters to be assigned. Undesirably, the operator must identify these special geometric features before the object is formed to assign the special build parameters, and if missed, build failure typically occurs.

There are currently four categories of special geometric features, or special build types that, when present, need to be identified on an object to be formed by stereolithography. These special build types are 1) Trapped Volumes, (2) Large Flat Up-facing Surfaces, (3) Near Flat Down-facing Surfaces, and (4) Delicate Features. Trapped Volumes and Large Flat Up-facing Surfaces cause problems that are generally solved by adjusting re-coating parameters as discussed in U.S. Pat. No. 5,945,058 to Manners et al. Near Flat Down-facing Surfaces sometimes cause border delamination and layer delamination problems when these features are built by default values of the general build style parameters. These problems can be solved by adjusting build parameters such as those related to support spacing, fill scanning, and border scanning, and the like. Delicate Features can cause problems because the re-coating parameters associated with most general build styles operate too vigorously, often knocking off the delicate feature as it is being built. Slowing down the re-coating parameters, or the like, can solve this problem. Extensive work has been done to develop different parameter sets for each of the special geometric conditions in order to solve their associated problems.

However, in order to properly form objects having any of these geometric configurations present, the operator must manually identify them. These special build types cannot be selected until the data representing the three-dimensional object to be built is imported into the platform and a Z-axis established for building the object prior to slicing. Undesirably, the special geometric features must then be visually identified by the operator who must manually assign one of the special build types to the range of Z-values in which the special feature resides. If the operator is inexperienced or inattentive, the assignment of a necessary special build type can be overlooked, which typically results in build part failure and the generation of long strands of solidified spaghetti-like material in the resin vat.

Although a special build type can be manually assigned to a range of Z-values of an object to be formed, problems can arise when two or more special build types are present within the same range of Z-values. For example, if a trapped volume and a delicate feature are located within the same range of Z-values, only the parameters associated with the last build style assigned will be used. Often, these parameters may not be appropriate in forming the object in the areas where the other special build type exists and can result in part failure. Currently, the only method to overcome this situation is for the operator to manually select each individual build and/or re-coating parameter. Only experienced and skilled operators are able to successfully recognize these conditions and select appropriate parameters. Thus, novice operators cannot successfully build many sophisticated geometric configurations without some trial and error. This is undesirable.

Thus, there is a need to increase the probability of a successful build by reducing the number of manual decisions by the operator to select the build parameters for an object. There is also a need to more fully automate the process of determining all the build parameters necessary to build any three-dimensional object desired.

These and other difficulties of the prior art have been overcome according to the present invention.

BRIEF SUMMARY OF THE INVENTION

The present invention provides its benefits across a broad spectrum of solid freeform fabrication (SFF) techniques. While the description which follows hereinafter is meant to be representative of a number of such applications, it is not exhaustive. As will be understood, the basic apparatus and methods taught herein pertaining to stereolithography can be readily adapted to many uses. It is intended that this specification and the claims appended hereto be accorded a breadth in keeping with the scope and spirit of the invention being disclosed despite what might appear to be limiting language imposed by the requirements of referring to the specific examples disclosed.

It is one aspect of the present invention to eliminate operator error as much as possible when build parameters are selected for forming a three-dimensional object layer by layer by a SFF process such as stereolithography.

It is another aspect of the present invention to automatically identify special build types within a given three-dimensional object to be formed.

It is still yet another aspect of the present invention to automatically assign a set of alternate parameters for each special build type identified in a given three-dimensional object to be formed.

It is a feature of the present invention to identify special build types within a range of Z-values of an object by processing the data descriptive of the object by a computer control system after orienting the object in accordance with a Z-axis.

It is another feature of the present invention to identify more than one special build type within a particular range of Z-values of an object by processing the data descriptive of the object after orienting the object in accordance with a Z-axis.

It is still another feature of the present invention to automatically select alternative parameters within a range of Z-values having more than one special build type identified within the range.

It is an advantage of the present invention that build failures are substantially minimized by automatically identifying special build types on an object and by automatically determining the alternative parameters for building the object where the special build types have been identified.

It is another advantage of the present invention that nearly any complex three-dimensional object can be successfully built with minimal expertise required of the operator.

These and other aspects, features, and advantages are achieved/attained in the apparatus of the present invention that employs a memory for selecting a general build style, a memory for receiving data representing the three-dimensional object, and a control computer programmed to process the selected general build style and object data to identify at least one special build type within a range of Z-values for the object. The apparatus further comprises a coating system for forming a layer of build material according to at least one parameter from the general build style or the special build type, and an exposure system for selectively applying prescribed stimulation to the layer according to at least one of the parameters of the general build style or the special build type.

The method of the present invention comprises a) determining a general build style for the object, b) providing data representing the three-dimensional object to be formed, c) orienting the data in accordance with a Z-axis, d) identifying at least one special build type for at least one range of Z-values of the object, e) forming a layer of build material according to at least one parameter from the general build style or special build type, f) exposing the layer of build material to prescribed stimulation to form successive lamina of the three-dimensional object according to at least one parameter from the general build style or special build type, and g) repeating the steps of forming and exposing the layer in order to form the three-dimensional object.

The apparatus and method is unique because the data representing the three-dimensional object is analyzed by a computer control system programmed to identify the more than one special build type within a given range of Z-values of the object. In one embodiment, conflicting parameters from two or more special build types identified within a range of Z-values are compared and the most conservative value is selected and assigned to a composite special build type for the range of Z-values. In another embodiment, all the parameters associated with one of the special build types identified are selected according to a special build type hierarchy. In yet another embodiment, the parameters of the two or more special build types are compared to corresponding parameters of the general build style, and the parameters of the special build type having the highest priority parameter change according to a special parameter hierarchy are selected. In one embodiment the alternative parameters for the special build types are predetermined parameter sets. Preferably the parameter sets are stored in a library of special build types for retrieval, as needed. In addition, it is desirable to have one parameter set for each special build type associated with each general build style available. However, in an alternative embodiment the values of the alternative parameters are calculated by a computer control system according to a linear, exponential or logarithmic relationship that can take into account the severity of the geometric condition.

BRIEF DESCRIPTION OF THE DRAWINGS

The aspects, features and advantages of the present invention will become apparent upon consideration of the following detailed disclosure of the invention, especially when it is taken in conjunction with the accompanying drawings wherein.

To facilitate understanding, identical reference numerals have been used, where possible, to designate identical elements or features common to the figures.

DETAILED DESCRIPTION OF THE PREFERRED EMBODIMENTS

Figure 1:
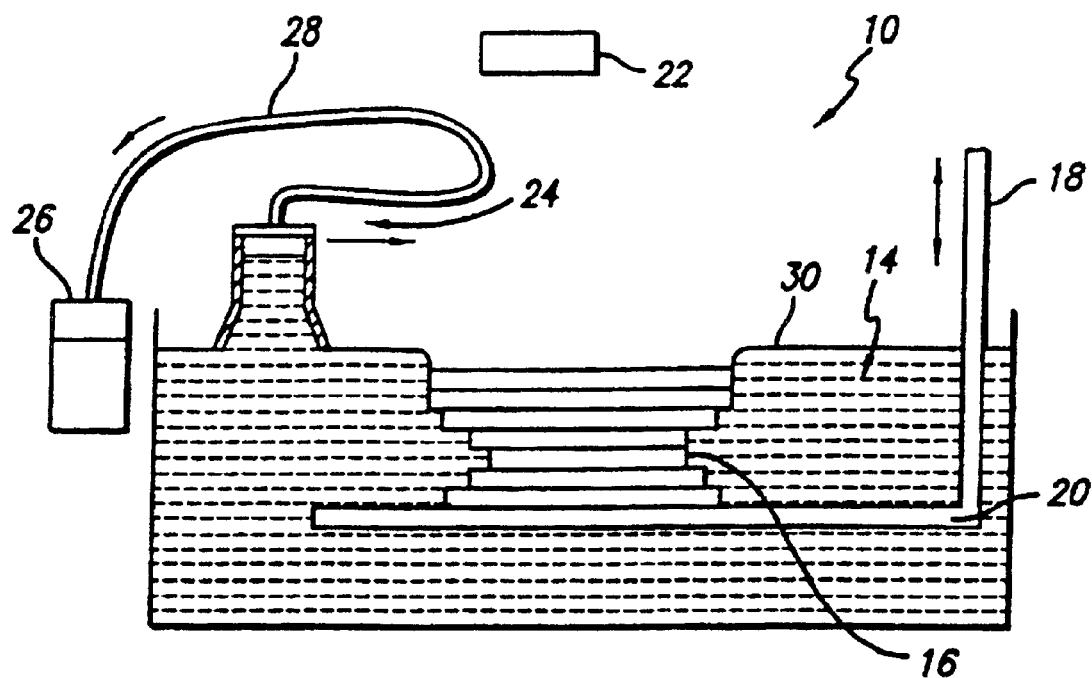
FIG. 1 is a side view of a stereolithography apparatus for practicing the present invention.
Figure 2:
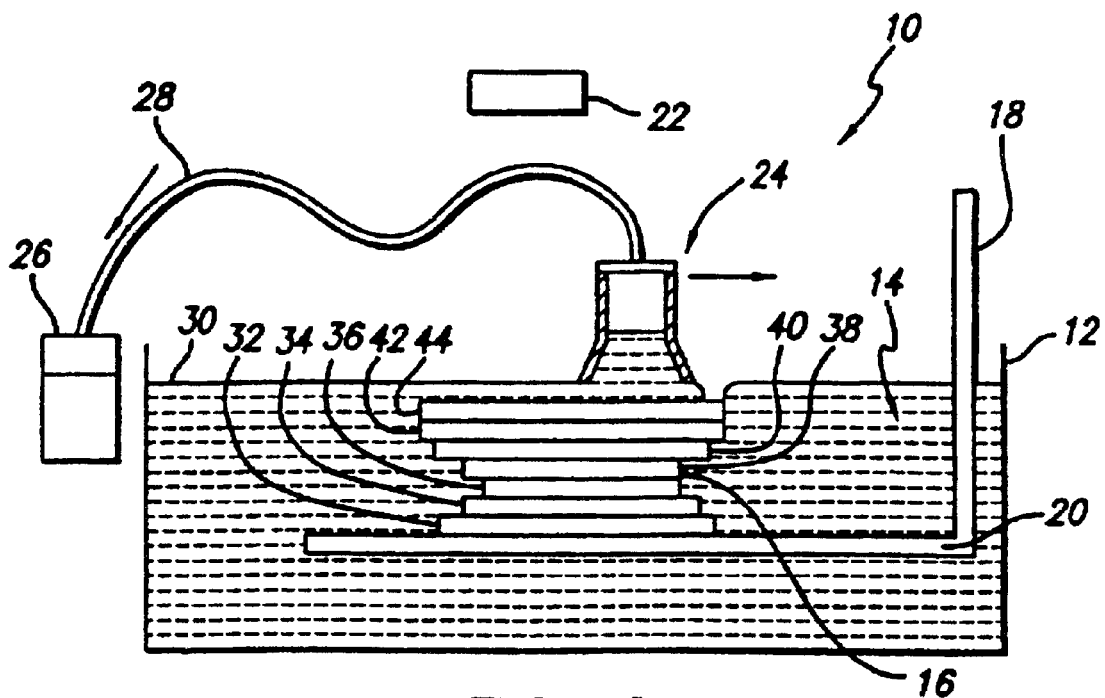
FIG. 2 is another side view of a stereolithography apparatus for practicing the present invention.

While the present invention is applicable to all SFF techniques, the invention will be described with respect to stereolithography. FIGS. 1 and 2 depict schematic representations of a stereolithography apparatus 10 for use with the instant invention. The stereolithography apparatus includes container 12 (i.e. vat) for holding the build material 14 (e.g. photopolymerizable material) from which a three-dimensional object 16 will be formed, an elevator 18 and elevator driving means (not shown), an elevator platform 20, an exposure system 22, a coating system comprising re-coating bar 24 and re-coating bar driving means (not shown), and at least one controller programmed for manipulating object data (as needed) and for controlling the exposure system, elevator, and coating system. A wide variety of building materials have been proposed in various SFF techniques, and although the build material herein discussed is a photopolymer liquid resin, the build material may be any solidifiable material applied in the form of a powder, liquid, gas, paste, or gel.

A preferred exposure system for exposing the photopolymerizable material to prescribed stimulation is described in numerous patents, such as, for example, U.S. Pat. No. 5,840,239 to Partanen, et al. The preferred system includes the use of a laser, beam expander (may be separate or included in the laser), and a pair of computer controlled X–Y rotatable scanning mirrors of either the motor driven or galvanometer type. Preferred computer control systems and data manipulation systems and software are described in a number of the patents, such as, for example, U.S. Pat. No. 5,597,520 to Smalley, et al. A preferred coating system is described in numerous patents, such as, for example, U.S. Pat. No. 5,902,537, to Almquist, et al. The coating system includes a re-coater bar 24, regulated vacuum pump 26, and vacuum line 28 connecting the bar 24 and the pump 26.

Other components of a stereolithography apparatus (not shown) may include a liquid level control system, a build chamber, an environmental control system including a temperature control system, safety interlocks, a viewing device, and the like. It should be understood that the instant invention is applicable to object formation using a system that lacks one or more of the elements mentioned herein, and is applicable to a system that includes all elements mentioned herein, or adds additional elements.

Stereolithography apparatuses on which the instant invention can be utilized are available from 3D Systems, Inc. of Valencia, Calif. These include apparatuses using a HeCd laser operating at 325 nm, and apparatuses using a solid state laser operating at 354.7 nm for the exposure system. Preferred build materials are photopolymerizable materials such as those manufactured by Vantico, Inc., of Los Angeles, Calif., and are available from 3D Systems, Inc. Materials manufactured by Vantico, Inc. that are well suited for use include SL5170, SL5220, SL5240, SL7510, SL7520, and SL7540. However, other prescribed stimulation systems and materials can be used, if desired.

The typical operation of a stereolithography apparatus involves alternating formation of layers of material (i.e. coatings of material) and the selective solidification of those layers to form an object from a plurality of adhered laminae. The process typically begins with the elevator platform 20 immersed approximately one layer thickness below the upper surface 30 of the photopolymerizable material 14. The layer of photopolymerizable material is selectively exposed to stimulation (e.g. a beam of UV radiation) which cures the material to a desired depth to form an initial lamina of the object adhered to the elevator platform. This initial lamina corresponds to an initial cross-section of the object to be formed or corresponds to supports, which may be used to adhere the object to the platform. After formation of this initial lamina, the elevator platform and adhered initial lamina are lowered a net amount of one layer thickness into the material.

As the material is typically viscous, and the thickness of each layer is very thin (e.g. 0.025 mm to 0.25 mm (0.001 to 0.010 inch)), the material may not readily form a layer over the last solidified lamina. In the case where a layer is not readily formed, a re-coating device may be swept at or somewhat above the surface of the resin (i.e. working surface of the material) to aid in the formation of a fresh layer of material. The layer formation process may involve the sweeping of the re-coating bar 24 one or more times at a desired velocity. After formation of this second layer of material, a portion of this second layer is solidified by exposure of the medium to stimulation according to data representing a second cross-section of the object. In an alternative process, layer formation over one portion of a previous lamina may occur simultaneously with exposure of an already formed portion of the layer, and is known as multiple layer curing. This process of layer formation and solidification is repeated over and over again until the object 16 is formed from a plurality of adhered layers (32, 34, 36, 38, 40, 42, and 44) as shown in FIG. 2.

The solidification process typically consists of the solidification of various regions according to object formation data produced by the computer control system that is delivered to a controller programmed to operate the coating system and exposure system. Generally, object formation data is the data that is used by any given SFF machine to drive the fabrication process. For example, stereolithography machines use vector scanning data in order to drive a laser to trace out each layer of the object while being formed. In addition, raster scanning data is used by solid deposition modeling machines in order to selectively deposit a build material to form an object. Other object formation data forms may be used and may include scanning pattern formats such as toggle point generation, contour scanning, directional scanning, model-based scanning, and the like.

In stereolithography the object formation data is vector scanning data derived from vector types generated during slicing such as boundary, hatch, and fill vectors which are well known in the art, and are taught in a number of publications and patents such as, for example, in U.S. Pat. No. 5,321,622 to Snead, et al. Briefly then, "boundaries" are border regions surrounding an area of a cross-section. The area may be that of a whole cross-section or a portion of a cross-section. Boundaries may be defined, inter alia, to surround up-facing cross-sectional regions, down-facing cross-sectional regions, and continuing cross-sectional regions (regions that face neither up nor down). Boundary vectors may be exposed one or more times, or may be offset and exposed one or more times, or may not be exposed at all.

"Skin Fill," "Fill," or "Skin," is typically an exterior portion of the cross-section that faces either upward or downward, and is thus an area that is typically completely exposed so as to form a solid surface region. "Hatch" is found within continuing regions or boundaries and may or may not be found in down-facing and up-facing exterior regions. Hatch may consist of a series of lines, point exposures (i.e. bullets), tiling patterns, or other patterns of exposure. Hatch patterns may result in complete solidification of the boundary regions within which they are used, or may result in partial solidification of those regions. Hatch and skin patterns may consist of overlaid exposures, crossing exposures, or repeated exposures. Hatch and/or fill may be retracted from one or more boundaries. In particular, hatch and/or fill may be retracted from a first boundary that is exposed.

In one classification scheme described in U.S. Pat. No. 5,321,622 to Snead, et al., each lamina of the object can contain one, two, or three different types of regions. These three types of regions are (1) down-facing regions, (2) up-facing regions, and/or (3) continuing regions (i.e. regions that are neither down-facing nor up-facing). These regions establish eight vector types, namely: (1) down-facing boundaries, (2) up-facing boundaries, (3) continuing boundaries, (4) down-facing hatch, (5) up-facing hatch, (6) continuing hatch, (7) down-facing skin, and (8) up-facing skin. Taken together, the down-facing boundaries, down-facing hatch, and down-facing fill, define the down-facing regions of the object. The up-facing boundaries, up-facing hatch, and up-facing fill, define the up-facing regions of the object. The continuing boundaries and continuing hatch define the continuing regions of the object.

Other schemes for region identification and vector type creation are described in various patents and applications referenced above, including, for example, U.S. Pat. No. 5,184,307 to Hull, et al.; U.S. Pat. No. 5,209,878 to Smalley, et al.; U.S. Pat. No. 5,238,639 to Vinson, et al.; U.S. Pat. No. 5,597,520 to Smalley, et al.; PCT WO 97/11837 to Almquist, et al.; and U.S. Pat. No. 6,084,980 to Nguyen, et al. Some schemes might involve the use of fewer designations such as: (1) defining only outward facing regions and continuing regions where down-facing and up-facing regions are combined to form the outward facing regions; (2) combining all fill types into a single designation; or (3) combining up-facing and continuing hatch into a single designation or even all three hatch types into a single designation. Other schemes might involve the use of more designations such as dividing one or both of the up-facing and down-facing regions into flat regions and near-flat regions, as described in U.S. Pat. No. 5,184,307 to Hull, et al.

In addition, the solidification techniques may involve a pause, or delay, after exposure of at least a portion of a cross-section. A delay may follow the exposure of all or some boundary, hatch, or fill vectors, in one or more directions. This delay may be used as a shrinkage period, where shrinkage results from, inter alia, one or both of chemical bond formation and cooling of the area last solidified by the laser.

In most methods of rapid prototyping, it is preferred to provide information regarding certain parameters, such as layer thickness, to the machine in preparation for building. These parameters control many of the actions that precede and/or occur during building, such as layer formation and solidification. It is desirable that these parameters are predetermined as much as possible; however, this has proven difficult due to the rather large number of possibilities resulting from various machines, resins, build types, and geometric configurations.

The given range for a parameter may be dependent on a number of conditions. For instance, a parameter may be the speed of scanning a laser beam over the surface of a material. Depending on the material, it may not be practical to scan any faster than a determined speed, as the desired effect—solidification of a polymerizable liquid—may not be attainable. On the other hand, scanning slower than a certain speed may be undesirable. For example, scanning too slowly may result in solidifying too deeply into a container of polymerizable liquid. Of course, scanning slower also takes more time, so any lower limit may also take into consideration the impact on build time. It is these considerations, and others, which determine the various ranges of values possible for particular parameters.

There are parameters available for controlling the stereolithography process. For example, parameters preferably used in liquid-based stereography may include but are not limited to: 1) layer thickness, 2) X&Y shrinkage compensation, 3) Z shrinkage compensation, 4) border overcure, 5) hatch overcure, 6) hatch type, 7) hatch spacing, 8) staggered weave, 9) alternate sequencing, 10) retraction: start, 11) retraction: end, 12) fill cure depth, 13) fill type, 14) fill spacing, 15) beam compensation on/off, 16) beam compensation value, 17) auto Z-correct, 18) additional boundaries, 19) multiple boundary offset, 20) Z-level wait, 21) pre-dip delay, 22) Z-dip velocity, 23) Z-dip distance, 24) number of sweeps, 25) gap percent, and 26) sweep velocity.

These parameters are preferably grouped based on the type of object to which they apply. For example, some parameters may be used with objects, and some may be used with supports. In addition, the parameters may also be grouped based on a general build style selected for the resultant three-dimensional object, and may be based on special geometric conditions present on the three-dimensional object. Not all parameters will typically apply in all cases, and based on circumstances, additional parameters may be added. While building the supports that hold the objects in place during part building, for example, only a selection of the above parameters are preferred. For instance, layer thickness (1), border overcure (4), Z-level wait (20), Pre-dip delay (21), Z-dip velocity (22), Z-dip distance (23), and number of sweeps (24) may be used from the list above. Additional parameters may also be used, such as a parameter known as line spacing, depending on how the supports were created.

Groupings of parameters may alternatively and/or additionally be based on the portion of the build process to which they apply. For instance, some parameters may be useful during the creation of a fresh layer of liquid (i.e. re-coating parameter), while other parameters may determine how the solidification of the layer is carried out (i.e. exposure parameter). Some re-coating parameters from the list above include numbers (20)–(26) and are often referred to as RCS parameters. Some of the exposure parameters from the list above affecting layer solidification include numbers (1)–(19) and are often referred to as STY parameters. Additionally, some of the parameters may be set for the whole span of Z-values of the part such as (15)–(17), while others may be set differently for various ranges of Z-values of the part. According to the present invention, the general build styles, special build types, and composite special build types all comprise sets of values for parameters selected from the group of exposure parameters and re-coating parameters above, and the values are used by the stereolithography apparatus to form the desired three-dimensional object. Other parameters, in addition to those discussed above, may be included according to the present invention, if desired.

In addition, other parameter groupings may be created based on the parameters needed to automatically generate supports. These types of parameters, herein collectively referred to as support parameters, include support type or types, minimum spacing between supports, gusset angle, and/or support height. Hence the parameters of the general build style and the alternative parameters of the special build types may be selected from any combination of re-coating parameters, exposure parameters, or support parameters. Additional parameter groupings may be used, if desired, other than those given in the examples above.

It is preferred to keep records of the groups of related parameters together for retrieval when needed. In a preferred stereolithography system, these records are kept in files known as style files. The contents of style files may vary for the reasons stated above, and are based on a number of other variables. These other variables may include the stereolithography machine type, the resin type, the type of re-coating device (if any), and other variables.

In a preferred stereolithography machine, an ASCII file, preferably called the StylesWizardin.ini, is supplied with the machine software as discussed in U.S. Pat. No. 6,159,411 to Kulkarni et al. In Kulkarni et al., a general build style for the object is selected by an algorithm which prompts the user to respond to a series of questions, and the answers are used to identify a final single group of parameters to build the object. The final single group of parameters comprises a set of parameters herein referred to as a "general build style." Not only is the general build style selected based on machine type, resin type, re-coating device, and the like, but also on other considerations such as the resultant object desired, type of units and layer thickness. For example, the final object may be intended for use as a sacrificial object in an investment casting process in which a selection of either a box or hexagon pattern can be selected. Investment casting objects, often referred to as QuickCast™ style objects by those operating 3D Systems stereolithography equipment, comprise hollow cells having a continuous surface surrounding an internal lattice structure. Other options are available for the resultant object type that influence the selection of a general build style and are available on 3D Systems stereolithography equipment include T (Thin Layer: build style with high Z resolution and thin layers), F (Fast: faster build style with less accuracy), and E (Exact: high accuracy build style but with thicker layers than Thin Layer). These types of objects are generally solid. Other general build styles may be included, as desired. For convenience, the computer control system includes a memory for storing any number of general build styles created by the operator.

Additional parameters are associated with the general build style and are used by the computer control system having data slicing software when preparing cross-sectional data for the object, such as the desired layer thickness, and the like. Once the general build style has been determined, the "platform configuration" can be saved by the operator and recalled again for building similar parts. This is desirable so that the operator does not have to answer repetitive questions, such as, the machine type, the resin type, and the like, every time an object is to be built. Often an operator only answers these questions once and from then on simply calls up the desired "platform configuration" just prior to importing data representing the object to be formed. Although the algorithm in Kulkarni et al. substantially reduces the number of errors that can be made by the operator of the stereolithography apparatus, a significant amount of skill and experience is still needed. For example, when special geometric configurations are present, the operator must manually identify them and modify the appropriate parameters prior to slicing the data representing the object.

Currently there are four special build types that must be manually identified by the operator. Each of these special build types requires alternative parameter values compared to those pre-selected by the general build style in order to build reliably. These special build types are based on special geometric configurations present on three-dimensional objects to be formed. The four special build types are (1) Trapped Volumes, (2) Large Flat Up-facing Surfaces, (3) Near Flat Down-facing Surfaces, and (4) Delicate Features. Where any of these geometric configurations are present, alternative parameters may be needed instead of the parameters associated with the general build style. These special build types cannot be selected until: (1) the data representing the three-dimensional object to be built is imported into the computer control system, (2) a Z-axis is established for building the object, and (3) the object is oriented by the operator according to the Z-axis to establish a build position. Undesirably, these special geometric configurations must be visually identified by the operator who then must manually assign one of the special build types to a range of Z-values on the part. If the operator is inexperienced or inattentive, the assignment of a necessary special build type can be overlooked, which often times results in build part failure.

In certain instances an object may contain one or more of these special build types at different locations on the object, or within the same range of Z-values of the object. Currently, two or more special build types cannot be simultaneously assigned within the same range of Z-values. If two or more are present, only the parameters from the last selected special build type will be used as they will override any previously assigned parameters. Thus, when two or more special build types are present within the same range of Z-Values, the operator must individually select each parameter necessary to achieve a successful build. This is a exceedingly demanding task for most seasoned operators to perform, if not impossible for the inexperienced operators. Thus, current processes available for selecting the parameters needed to produce successful builds are not entirely automated and require the operator to exercise his or her own judgment. These limitations are overcome according to the present invention.

Figure 3:
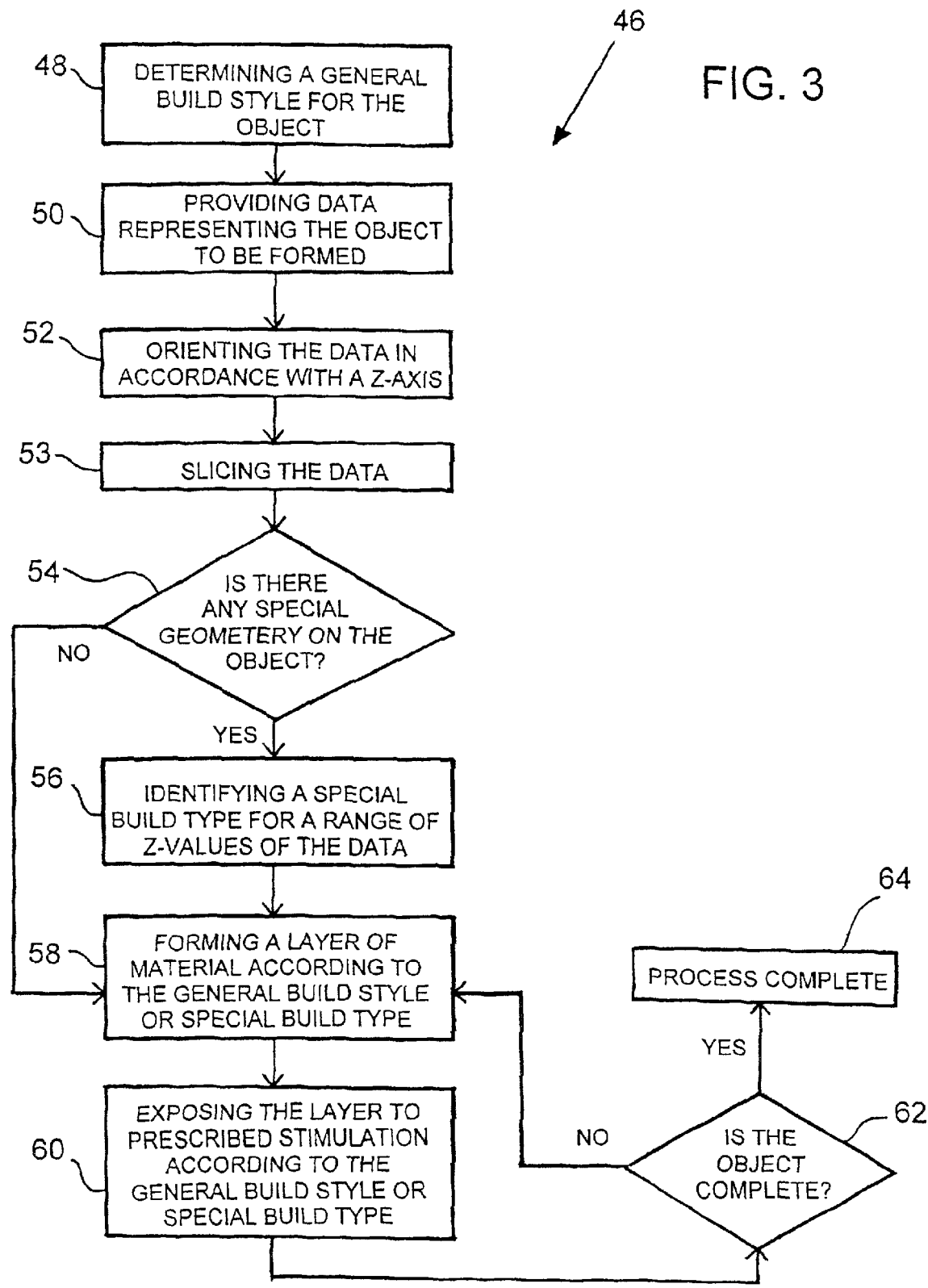
FIG. 3 is a flow chart depicting an embodiment of the present invention.

In a preferred embodiment, which has been selected for purposes of illustration, referring to FIG. 3, a first embodiment of the method of the present invention is shown generally by the numeral 46. The first step shown by the numeral 48 involves determining the general build style for the object. As previously discussed, the general build style can be determined by responding to a series of questions, as disclosed in U.S. Pat. No. 6,159,411 to Kulkarni et al. Alternatively, the general build style can be determined by calling up on the computer control system an already existing "platform configuration," as previously discussed. As discussed in Kulkarni et al. and herein, the build parameters of the general build style comprise both exposure parameters and re-coating parameters and are held in a memory for storing the general build styles. Some of the build parameters also reflect the particular stereolithography apparatus to be used, the particular resin to be used, the units for the three-dimensional object, and the like.

The second step, identified by the numeral 50, involves providing data representing the object to be formed. Typically, the data is represented in STL format and is imported from any conventional CAD system. Other formats for the data representing the object may be used, if desired, such as, Computerized Axial Tomography (CAT scan), Initial Graphics Exchange Specification (IGES), Numerical Control formats (NC), and the like. Preferably, the computer control system includes a memory for receiving the data representing the three-dimensional object to be formed.

The third step in the method, identified by the numeral 52, involves orienting the data in accordance with a Z-axis that corresponds to the direction of gravity when the object is built. Specifically, the Z-axis vector points in the direction that is directly opposite the direction of gravitational pull. Orienting the data in accordance with the Z-axis is preferably done by the computer control system provided by instructions from the operator who establishes an optimal orientation of the object to be built. During this step, the operator typically rotates the part in the X-, Y- and Z-axes in order to position the part such that the most desirable surfaces face upwardly in the Z-direction. Once oriented, a span of Z-values that effectively covers the object is established. Alternatively, the orientation of the Z-axis could be selected by a computer algorithm provided in the computer control system, which could randomly select the orientation, or could select a default position upon importing object data, if desired.

The fourth step, identified by the numeral 53, involves slicing the object data as disclosed, for instance, in U.S. Pat. Nos. 5,182,715 to Vorgitch et al., U.S. Pat. No. 5,184,307 to Holt et al., and U.S. Pat. No. 5,321,622 to Snead et al. Generally, the computer control system slices the data representing the three-dimensional object to be formed into a plurality of planes generally perpendicular to the Z-axis utilizing at least one parameter from the general build style to establish sliced object data. Preferably the slicing algorithm used by the computer control system identifies the down-facing regions of the object, the up-facing regions of the object, and the continuing regions of the object which can be conveniently processed to identify whether any of the four special geometric conditions (special build types) are present during the processing that establishes the sliced object data.

The fifth step of the method of the present invention, identified by the numeral 54, is the determination of whether there are any special geometric features present on the object. Preferably, the slicing algorithm discussed above identifies the special geometric condition and, when present, assigns at least one special build type within at least one range of Z-values of the data of the three-dimensional object where the special geometric condition resides. The range of Z-values is selected by the slicing algorithm from the complete span of Z-values of the data that is in alignment with the Z-axis established in step 52.

The sixth step, identified by the numeral 56, involves identifying the special build types from a selection of build types including 1) a trapped volume type, 2) a near flat down-facing surface type, 3) a large flat up-facing surface type, and 4) a delicate feature type, and assigning the type to the range of Z-values determined in step 54. Each of the four types may have their own set of alternative parameters for use by the stereolithography apparatus to form the layers of the three-dimensional object. Generally, a memory for storing a plurality of parameter sets is provided for the computer control system. Preferably, the special build type parameters are provided in a memory for storing a library of special build types held in the memory, in which the computer control system then selects the appropriate special build type from the library. The library is similar to a lookup table containing parameter sets, or the like, such as the one disclosed in U.S. Pat. No. 6,159,411 to Kulkarni et al. Preferably, steps 54 and 56 are performed simultaneously during or after slicing the object data and are therefore only separate steps in the conceptual sense.

Assuming the three-dimensional object does have at least one special geometric condition, the step identifies and associates the particular special build type with the range of Z-values where the special geometric condition is present, which may encompass the entire span of Z-values of the object, if needed, such as when the special geometric condition is present throughout the object. This step is indicated by numeral 56. Preferably this processing is accomplished by the computer control system. The range of Z-values assigned to a special geometric condition can be determined by taking into account a variety of data empirically derived. For example, it may be desirable to assign upwards "X" number of layers to the range of Z-values associated with a near flat up-facing surface and also downwards "N" numbers of layers of thickness below, the numbers "X" and "N" being determined with empirical data shown to produce optimal results. In another example, if the width of the flat up-facing surface is below an empirically determined threshold width, the special geometric condition can be ignored, if desired.

As discussed previously, the special geometric condition could be a trapped volume type, a near flat down-facing surface type, a large flat up-facing surface type, or a delicate feature type. Preferably, there is a special build type comprising a unique set of parameters, and each special build type is associated with a specific general build style. This is typically ideal since a general build style normally would be associated with a specific stereolithography apparatus, resin, and the like, which is normally used over and over when forming a variety of parts. Thus, each general build style would benefit by having its own unique parameter sets for the various special build types that could be present in objects being formed in conjunction with each general build style. Hence it is preferred to provide these parameter sets associated with the special build types and the general build style in a library of special build types. This is preferably done by providing a memory for storing the library of special build types for the computer control system.

Although the special build type is selected from a library of special build types similar to a lookup table, the algorithm must also determine the range of Z-values in which each special geometric condition resides within the span of Z-values for the object. This is preferably done by the slicing algorithm, however, it may also be accomplished by a separate algorithm that post-processes the sliced object data, if desired. Selecting a range of Z-values to apply the alternative parameters of the special build type to be used in forming the layers of the object within the range is necessary when it is desired to optimize the build process. Testing and empirical data must be relied on to determine the appropriate conditions for the algorithm to utilize in order to make the range selection.

The next step of the method, identified by the numeral 58, involves forming a layer of material according to at least one of the parameters from the general build style, or according to at least one of the parameters from the special build type by a coating system. The parameter is selected from the special build type for layers being formed within the range of Z-values, and from the general build style for all other layers being formed in the span of Z-values with the three-dimensional object.

After forming a layer of material, the next step, identified by the numeral 60, involves exposing the layer of material to prescribed stimulation to form successive lamina of the three-dimensional object by an exposure system. The layer is exposed according to at least one of the parameters from the general build style, or according to at least one of the parameters from the special build type. Similar to the forming of the layer, the parameter being selected for exposing the layer of material is selected from the special build type for layers being formed within the range of Z-values, and from the general build style for all other layers being formed in the span of the Z-values.

Once a layer has been formed, the algorithm repeats steps 58 and 60 until the object is completed, as indicated by the question identified by the numeral 62 in FIG. 3. If the object is not completely formed, the steps of forming the layer identified by the numeral 58, and the step of exposing the layer to prescribed stimulation identified by the numeral 60, are repeated until the process is complete, as identified by the numeral 64. At this point in the process the three-dimensional object has been completely formed by the stereolithography apparatus.

During the processing by the computer control system, object formation data is produced. In many SFF machines such as stereolithography machines, the object formation data is delivered to a separate controller that then operates the coating system and exposure system to form the three-dimensional object. In stereolithography, vector scanning operations are carried out by the controller for both the coating system and the exposure system, however, other operations may be used if desired, such as raster scanning or the like.

In the steps identified by the numerals 54 and 56, the method automatically detects, for instance trapped volumes, near flat down-facing surfaces, large flat up-facing surfaces, and delicate features, and assigns the type detected to a range of Z-values. This is accomplished by a computer control system programmed to identify the special build types for a range of Z-values. For example, the automatic detection of trapped volumes in slicing algorithms is disclosed in U.S. Pat. No. 5,945,058 to Manners et al. and U.S. Pat. No. 6,029,096 to Manners et al. The automatic detection of near flat down-facing surfaces in slicing algorithms is disclosed in U.S. Pat. Nos. 5,345,391 and 5,184,307 to Hull et al. Large flat up-facing surfaces are automatically determined in slicing algorithms disclosed in U.S. Pat. Nos. 5,345,391 and 5,184,307 to Hull et al. It is with the adaptation of the slicing algorithms above in accordance with the teachings herein by which the method of the present invention can be practiced.

As used herein, delicate features refer to geometrical conditions or features of a three-dimensional object that is/are sufficiently thin and/or elongated. Such features are typically those that could easily break off during or after formation of the object. Such thin and/or elongated features have generally small cross-sections when sliced by the algorithm prior to formation, and typically require gentle (slower) re-coating parameters to avoid damage when they are formed. One example of a delicate feature, for instance, would be the masts of a sailing ship if a sailing ship were formed in a layer by layer manner in a stereolithography process. Presently, operators must visually identify the geometry where delicate features are present, and must manually change the re-coating parameters in the range of Z-values in which they reside. Thus, to automatically identify such features requires analysis of empirical data from experienced operators as to when they decide a delicate feature is present. One method that can be employed to detect such delicate features would be to utilize, in an inverted manner, the slicing procedures for determining trapped volumes.

For example, referring to U.S. Pat. No. 5,945,058 to Manners et al., a variety of slicing procedures are disclosed for determining trapped volumes by processing initial cross-section boundaries (ICSBs) of adjacent layers of the object. The processing can be boundary based, raster-line based, or bitmap based, or the like. Regardless of the data format for processing, trapped volumes detection methodology involves first identifying data indicative of an initial trapped volume region for a given layer "N" ($ITV_N$). Second, a union operation is completed between the initial trapped volume for the given layer "N" ($ITV_N$) with the intermediate up-facing boundary data of the lower layer "N-1" ($IUB_{N-1}$) to yield a potential trapped volume region for layer "N" ($PTV_N$). Third, it is determined whether any holes exist in the initial cross-section boundary of layer "N," and if so, they are so designated as initial cross-section boundary layer holes ($ICSBH_N$). Fourth, a comparison is made between each area element or pixel of each hole found in the $ICSBH_N$ with each area element of the $PTV_N$. A trapped volume can then be identified ($TV_N$) when each hole element has a match with each element in the $PTV_N$. Alternatively, a trapped volume can be identified ($TV_N$) when each hole has more than a set percentage of area elements matched in the $PTV_N$. In a third alternative, a trapped volume can be identified ($TV_N$) when each hole has less than a set area unmatched with elements in the $PTV_N$. Empirical data is used to determine the point (value) at which particular data is assigned as a trapped volume or not. The steps are repeated for each cross-section of data representing the three-dimensional object, and appropriate parameters are accordingly output.

Although the above procedure automatically determines trapped volumes, by "inverting" the procedure to search for solid cross-sections (e.g. "solid" holes), delicate features can be automatically determined. By inverting the procedure, and by adopting empirical data to determine the point at which particular data is assigned as a delicate feature, delicate features can be identified ($DF_N$) for those layers ("N" values) that can accordingly be assigned to a range of Z-values. Such inversion could be accomplished, for instance, by adopting a left-hand rule vector analysis during the processing for determining delicate features while following the conventional right-hand rule for other processing.

Figure 4:
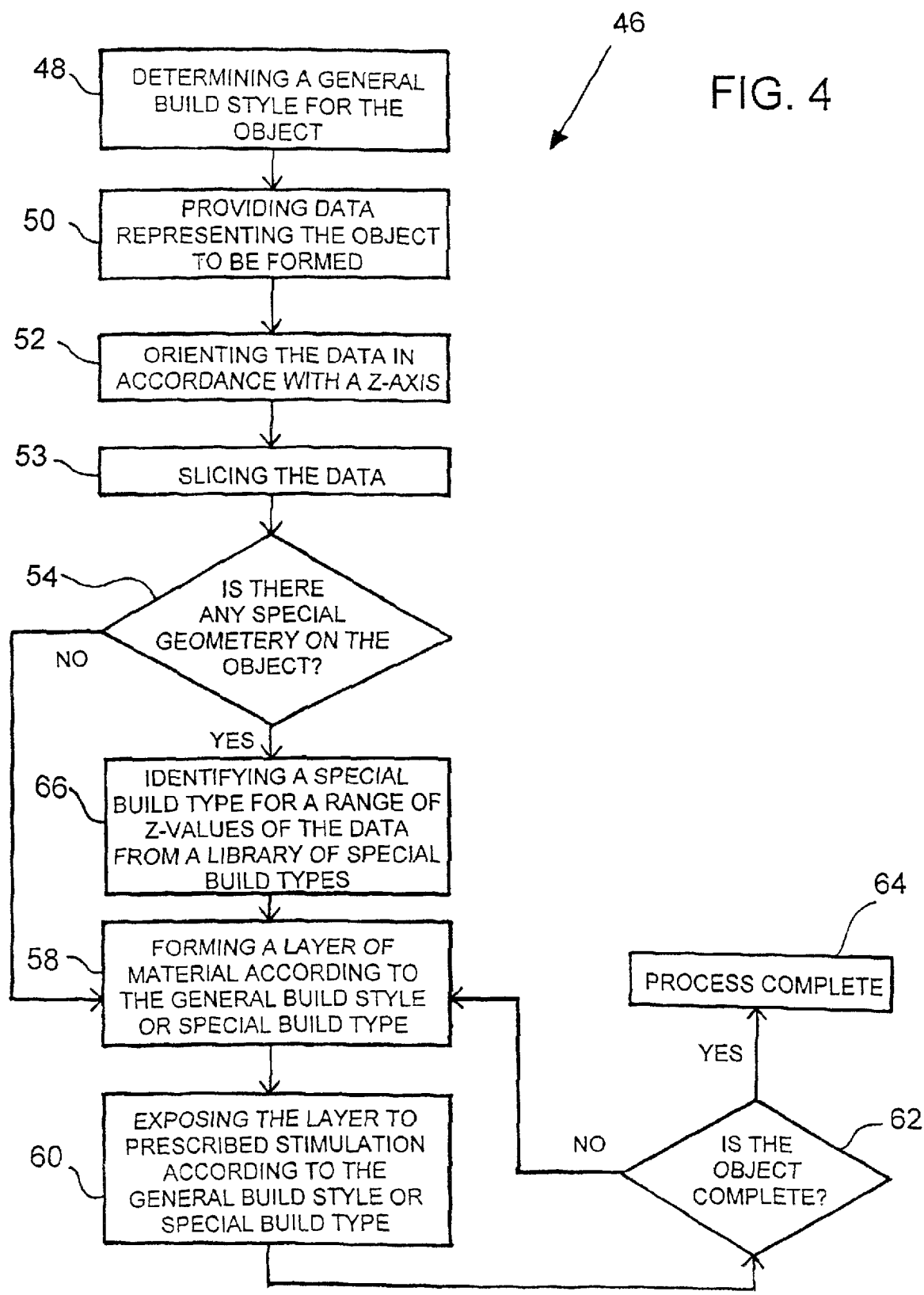
FIG. 4 is a flow chart depicting another embodiment of the present invention.

Referring to FIG. 4, a second embodiment of the method of the present invention is shown generally by the numeral 46. The embodiment shown in FIG. 4 is nearly identical to the embodiment shown in FIG. 3, except that the special build type for the range of Z-values is identified and selected from a library of special build types as indicated at step 66. The values for the parameters for the special build types are typically determined by extensive testing of each possible general build style with each possible special build type, and upon producing successful builds, the parameter values are sorted into parameter sets. Preferably, for each general build style available, at least one parameter set is established for each special build type, such as for the trapped volume type, the near flat down-facing surface type, the large flat area type, and the delicate feature type.

Figure 5:
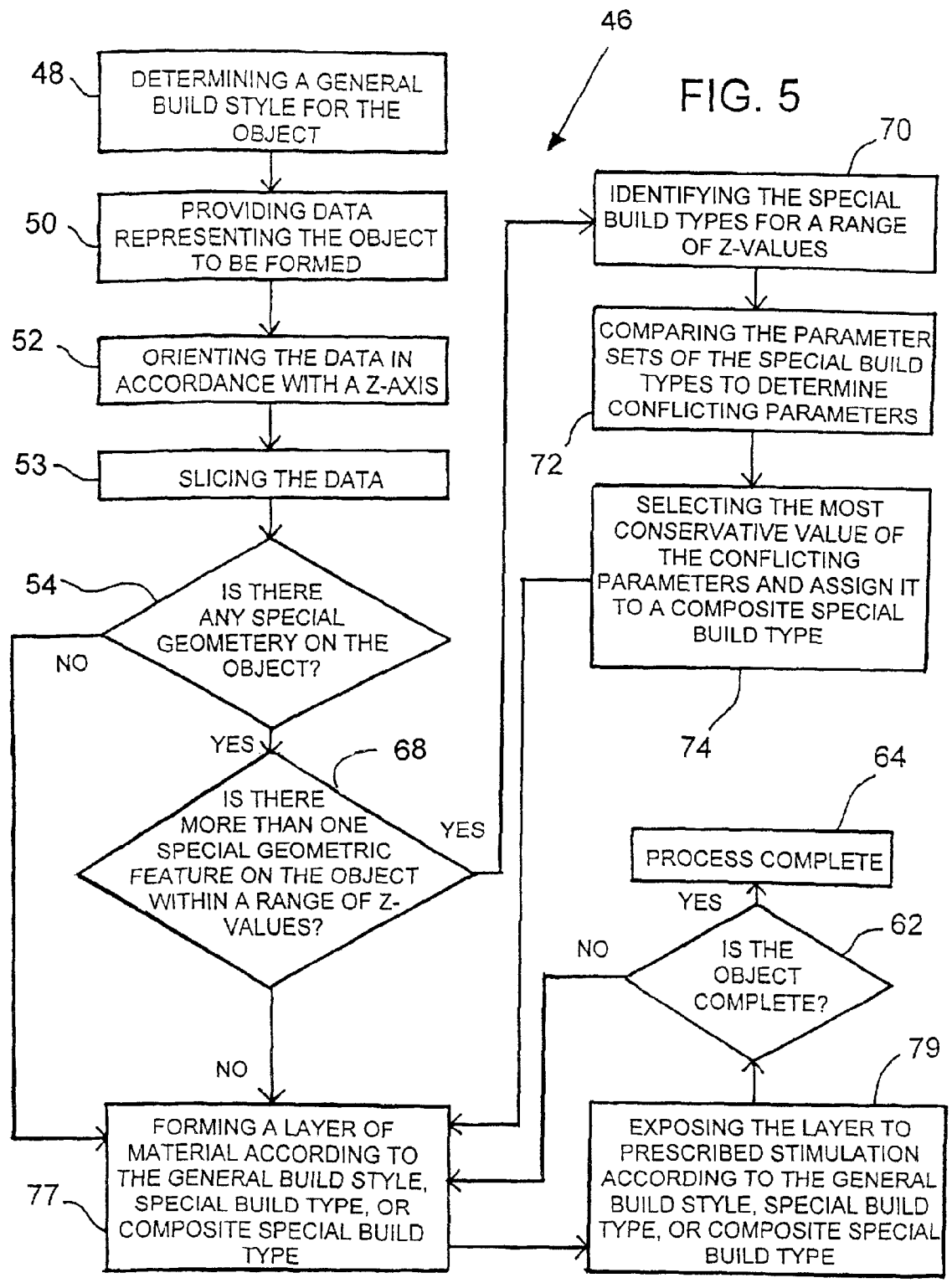
FIG. 5 is a flow chart depicting yet another embodiment of the present invention.

Referring to FIG. 5, a third embodiment of the present invention is shown generally by the numeral 46. In this embodiment, more than one special build type may be present within a given range of Z-values of the three-dimensional object. In this embodiment, the first five steps identified by the numerals 48, 50, 52, 53, and 54 are identical to the steps identified by the same numerals in the previous embodiments. However, in this embodiment an additional step is taken by the method which is identified by the numeral 68. In this step the question is asked whether there is more than one special geometric condition within a given range of Z-values. The slicing algorithm can easily determine this by comparing and checking for overlapping ranges of Z-values for the range of Z-values for each special build type identified. Assuming more than one special geometric condition type exists within a given range, the embodiment in FIG. 5 then identifies those special build types within the same range of Z-values as indicated at the numeral 70. This can be accomplished simply by the algorithm establishing a new range of Z-values where there is overlap and assigning all special build types present to this new range.

As discussed previously, each special build type found within a given range of Z-values has its own set of parameters. The next step, identified by the numeral 72, involves comparing the alternative parameters of the parameter sets of the more than one special build types present to determine conflicting parameters between the sets. As used herein, the term conflicting parameters refers to alternative parameters from different parameter sets that are associated with different special build types present in the same range of Z-values, in which the alternative parameters are for the same parameter type but have a different value. When each build type contains a different value for the same parameter type, a decision must be made as to which value to use. Preferably the computer control system utilizes an algorithm that selects the most conservative value of the conflicting parameters and assigns this value to a composite special build type for the range of Z-values. As used herein, the most conservative value of a given parameter is the one value between either conflicting parameters or corresponding parameters which would cause the solid freeform apparatus to take the longest time to form the object. The most conservative value may be the higher or lower value for a particular parameter, which depends on the type of parameter being considered. For example, parameter values that lengthen the delay time between sweeps of the re-coating blade (e.g. a higher value), or that slow down the sweep speed of the re-coating blade (e.g. a lower value), are more conservative values. Values that slow down the scanning speed of the laser are also more conservative values. Generally, selecting the most conservative value between conflicting parameter values for a given parameter type depends on selecting either the greatest value or the lowest value for the particular parameter type itself. Thus, it is straightforward to develop an algorithm for the computer control system to access, for a given parameter type, instructions on whether to select the greatest value or lowest value in order to determine the most conservative value.

Unique to the third embodiment is that values for parameters from different special build types can be mixed and matched into a special composite build type during processing step indicated at the numeral 74. For example, all of alternative parameters from the parameter sets of the different special build types that do not conflict (i.e. are not conflicting parameters) can be assigned to the special composite build type. These newly assigned parameters of the special composite build type are then used when forming and exposing the layers within the range of Z-values where the multiple special build types are present, and along with those from the general build type and special build type for the other layers, the three-dimensional object can be formed as indicated in by steps 76 and 60. Preferably the special composite build type is assigned to a separate range of Z-values where the two or more special geometric conditions overlap, although it could be assigned to a range encompassing all the special geometric conditions, if desired.

The embodiment of FIG. 5 is nearly identical to the previous embodiments in the step of forming the layer of material, as identified at the numeral 77, and in the step of exposing the layer to prescribed stimulation, as identified at the numeral 79 except that in each case, a composite special build type may be used in addition to the general build style and special build types. Again, the steps are repeated, as indicated by the numeral 62, until the process is complete as identified by the numeral 64.

Figure 6:
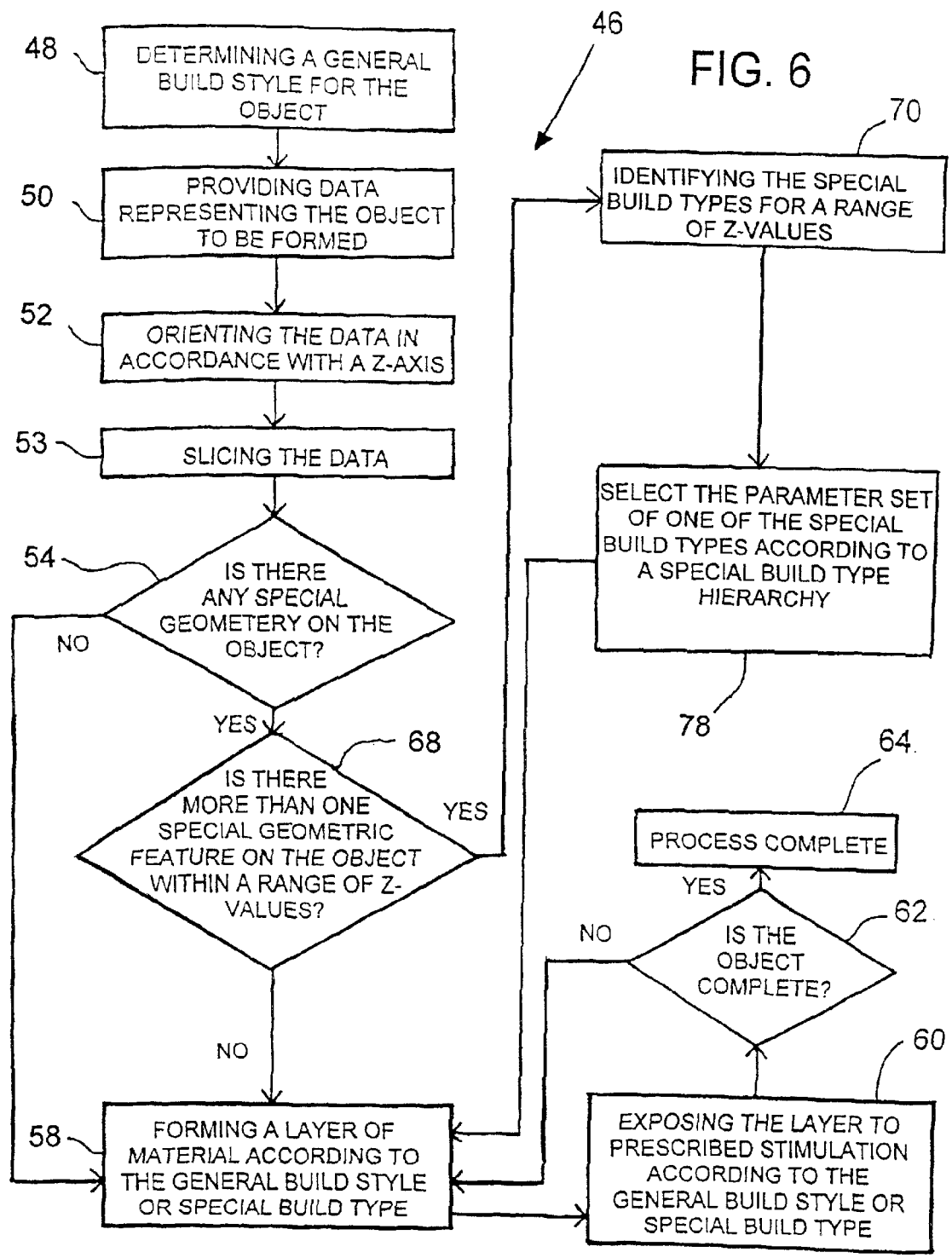
FIG. 6 is a flow chart depicting still yet another embodiment of the present invention.

A fourth embodiment is shown in FIG. 6. This embodiment is essentially identical to the embodiment shown in FIG. 5 with the exception that an alternative method is used to determine the parameters for a given range of Z-values having more than one special geometric condition type present. In the embodiment shown in FIG. 6, once two or more special build types within the range of Z-values are identified, as indicated at numeral 70, the parameters from only one of the special build types is used for building the three-dimensional object within the range of Z-values. This is accomplished, as identified at the numeral 78, by selecting the special build type having the highest priority according to a special build type hierarchy. For example, the special build type hierarchy could make trapped volume types the highest priority type, taking precedence over delicate features, which in turn would take precedence over near flat down-facing surfaces, which in turn would take precedence over enlarged flat areas. Developing the special build type hierarchy can be done by consulting experienced stereolithography operators as discussed above, or by conducting a variety of trial runs for the variety of general build styles possible. For example, the special build type hierarchy may favor delicate features over trapped volumes for one type of general build style, yet favor trapped volumes over delicate features for another general build style. Thus, the special build type hierarchy may be different for each of the various general build styles possible. Further, the special build type hierarchy may be associated with an overlapping range of Z-values where the two or more special geometric conditions are present, or to an all encompassing range of Z-values, if desired.

Figure 7:
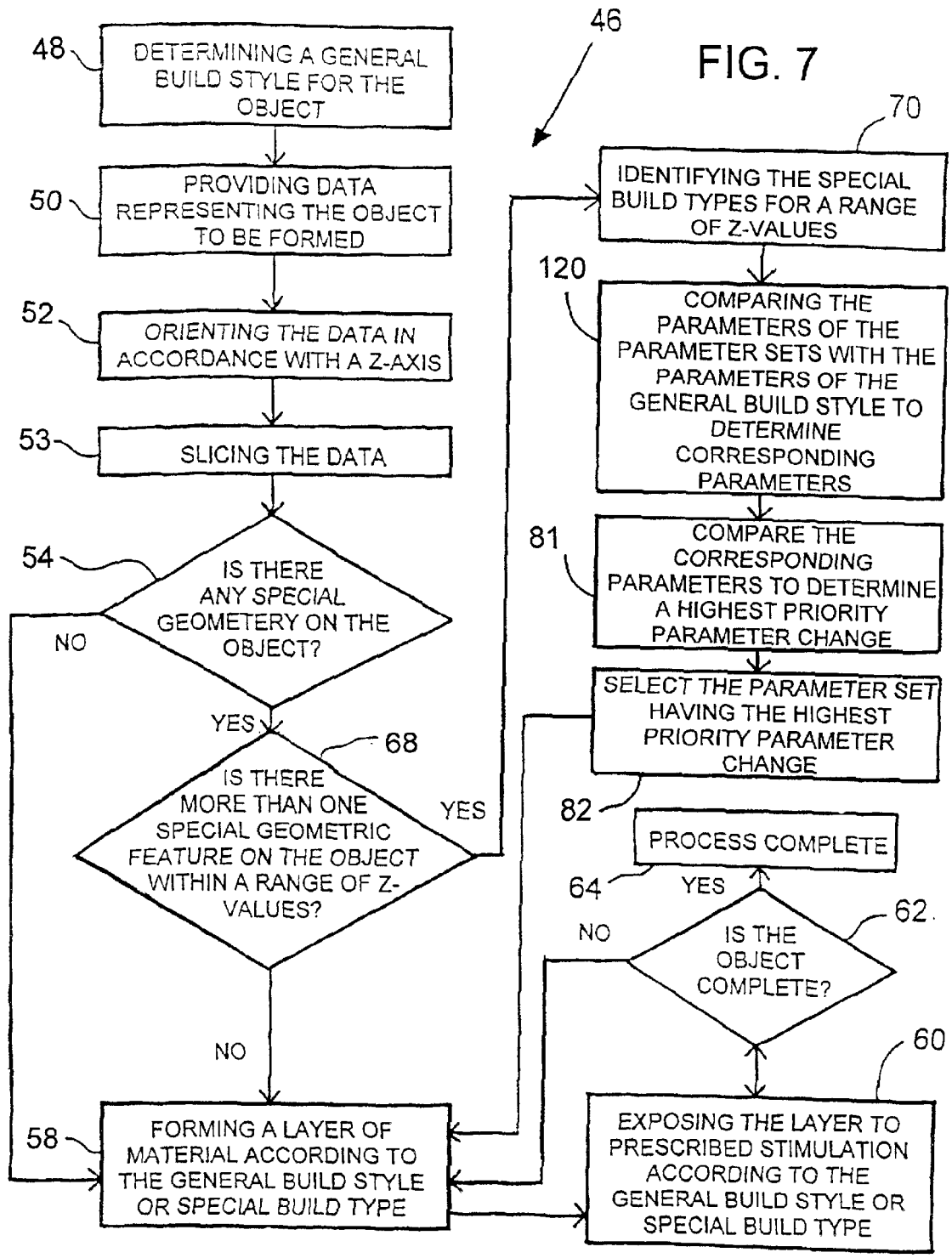
FIG. 7 is a flow chart depicting still yet another embodiment of the present invention.

A fifth embodiment is shown in FIG. 7 that is substantially identical to the embodiment shown in FIG. 6. However, in the embodiment shown in FIG. 7, an alternative method of selecting the parameters for the range of Z-values when more than one special geometric condition is present is provided. In this alternative method, the parameters of the special build types are compared with the parameters of the general build style to determine the presence of corresponding parameters as shown by the step identified by the numeral 120. As used herein, corresponding parameters are alternative parameters from any special build style that are of the same parameter type as of a parameter type that is present in the general build style. Corresponding parameters may or may not have the same value for the particular parameter type, although preferably they have different values. For example, when the value of any alternative parameter from any of the special build types present is compared to the value for that parameter in the general build style and is found to be different, the parameter type is identified as a parameter change and is accordingly identified as a corresponding parameter. In the next step identified by the numeral 81, all the corresponding parameters are then compared to a special parameter hierarchy listing each parameter type in an order of priority in order to determine a highest priority parameter change of one of the corresponding parameters. The next step, identified at the numeral 82, is where the parameter set from the special build type having the highest priority parameter change according to the special parameter hierarchy is selected. For example, changes to a parameter type such as sweep velocity may have precedence over changes to a Z-wait parameter in a re-coating file. Given two special build types, a parameter change of one of the sets having the highest preference according to the special parameter hierarchy would be determined to be the highest priority parameter change among the parameter sets, and all its parameters and values (parameter set) will be selected to form the object within the range of Z-values where the two special build types are present. Again, the special parameter hierarchy may be determined by consulting experienced stereolithography operators, or by testing, if desired. Further, the special parameter hierarchy may be associated with an overlapping range of Z-values where the two or more special geometric conditions are present, or to an all encompassing range of Z-values, if desired.

In the fifth embodiment shown in FIG. 7, it may be desirable to include further steps to provide a resolution to the situation in which there may be a tie, such as when the highest parameter change for two or more special build types may be the same. For example, a trapped volume type and a delicate feature type within the same range of Z-values may both have the same highest parameter change, such as a change for the Z-wait parameter compared to the value in the general build style. One solution to this situation would be to determine the most conservative value for this parameter, and then select the entire parameter set of the special build type having the most conservative value. Alternatively, the entire parameter set of special build type having the greatest magnitude change for this parameter could be selected. In addition, in the event of a tie, the steps of the fifth embodiment shown in FIG. 7 could be repeated by considering a next highest parameter change for each parameter set, and so on, until one parameter set is finally selected.

Alternatively, instead of utilizing a look-up table or its equivalent for selecting the values of the alternative parameters, the values could be calculated by the computer control system in proportion to the severity of the geometric condition. For example, a linear relationship may be used by the computer control system to calculate any alternative parameter value by utilizing the set value of the parameter from the general build style and applying an appropriate equation such as:

$$V_{alt} = (M \times W) + V_{default}$$

where "$V_{alt}$" is the new alternative parameter value calculated, "M" is an experimentally determined constant, "W" is a value indicative of the severity of the special geometric condition, and "$V_{default}$" is the value of the parameter from the general default style. The new alternative parameter value calculated could increase (or decrease), as desired, up to an empirically predetermined value such as maximum (or minimum) limit.

In one approach, the width of the special geometric condition determined by the slice algorithm could be used as the "W" value that is indicative of the severity of the special geometric condition. This would be desirable when processing near flat down-facing surfaces and large flat area surfaces for determining the values of alternative parameters such as Zwait and PreDip delay. One advantage of calculating the values of the alternative parameters is that they can effectively be determined in proportion to the severity of the geometric feature. For instance, the optimal value for a parameter such as Zwait for a large flat area condition may vary depending on the severity of the condition, and the width of the flat area can be indicative of the severity. Determining the width can be accomplished, for example, as the minimum width for hatch vectors is determined as discussed in U.S. Pat. No. 5,137,662 to Hull et al. The calculated value of any alternative parameter can be accomplished, for example, by other equations utilizing any number of relationships, such as:

$$V_{alt} = (M \times W^2) + V_{default} \text{ (an exponential relationship), or}$$

$$V_{alt} = (M \times \log(W)) + V_{default} \text{ (a logarithmic relationship).}$$

Whatever relationship used, it is to be appreciated that any number of relationships can be used and they can be tailored to meet the specific demands of any special geometric condition. For example, a linear relationship may be appropriate for alternative parameters for near flat down-facing surfaces while a logarithmic relationship may be appropriate for trapped volumes. In addition, any of these proportional relationship calculations may be used in conjunction with look-up tables, if desired.

Referring now to FIGS. 8–13, specific examples of special geometric features are illustrated and discussed in conjunction with the embodiments shown in FIGS. 3–7.

Figure 8:
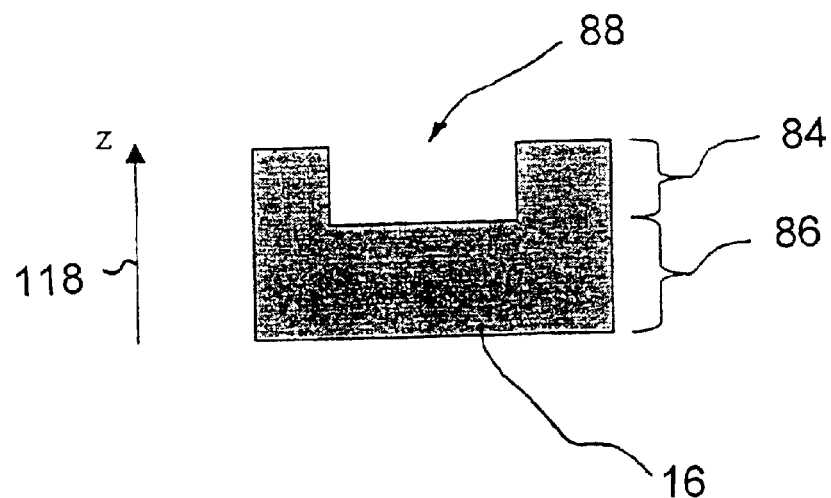
FIG. 8 depicts an example where one special build type exists within a range of Z-values on a three-dimensional object to be formed.

Shown for purposes of illustration in FIG. 8 is a schematic side view of a three-dimensional object identified by the numeral 16. The three-dimensional object has a first range of Z-values identified by the numeral 86 and a second range of Z-values identified by the numeral 84. The three-dimensional object is shown already oriented with respect to a Z-axis identified by the numeral 118. The three-dimensional object has a trapped volume special build type identified generally by the numeral 88 which resides in the second range of Z-values 84.

TABLE 1

| Parameter | Style File | General Default | Trapped Volume Default | Correct Value to Use for Zrange1 | Correct Value to Use for Zrange2 |
|---|---|---|---|---|---|
| # Additional Boundaries | STY | 1 | | 1 | 1 |
| Border OC | STY | 0.007 | | 0.007 | 0.007 |
| Hatch OC | STY | −0.001 | | −0.001 | −0.001 |
| Fill CD | STY | 0.007 | | 0.007 | 0.007 |
| Sweep V | RCS | 2 | 1 | 2 | 1 |
| Zwait | RCS | 10 | 30 | 10 | 30 |

Now referring to Table 1 above, a list of parameters and values are shown for the general build style which is used to form the layers located in a first range of Z-values 86 corresponding with FIG. 8. Also shown is a list of parameters and their values associated with the special build type (trapped volume) which exists in the range of Z-values identified by the numeral 84. In this example, the special build type is a trapped volume 88 having just two alternative parameters, one for sweep velocity (value=1) and the other for Zwait (value=30). These alternative parameters are re-coating parameters generally noted by the abbreviation RCS in the table. Referring to the column (Zrange1) which corresponds to the range of Z-values identified at the numeral 86, all the values of the parameters of the general build style will be used to form the layers of the three-dimensional object within this range. Referring to the column (Zrange2) corresponding to the range of Z-values identified at the numeral 84, it can be seen that the values of the parameters of the trapped volume for sweep velocity and Zwait are substituted for the values previously provided by the general build style. This is an example of a type of object configuration that can be automatically processed according to the first embodiment shown in FIG. 4.

Figure 9:
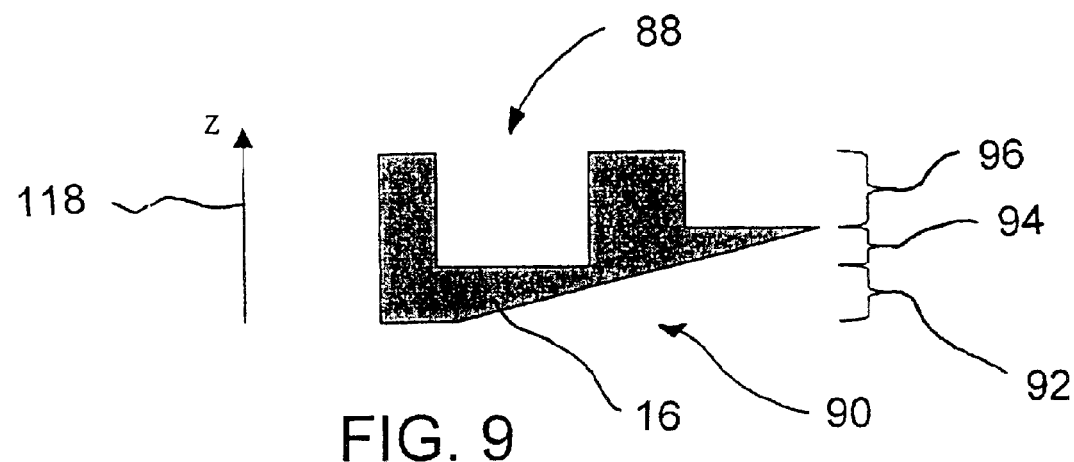
FIG. 9 depicts an example where two special build types overlap within a range of Z-values on a three-dimensional object to be formed.

Now referring to FIG. 9 for illustration purposes, an example is shown wherein more than one special build type is found to overlap within a range of Z-values for the three-dimensional object, and wherein the most conservative alternative parameters are selected from the two overlapping build types. Shown in FIG. 9 generally by the numeral 88 is a trapped volume type, and by the numeral 90 a near flat down-facing surface type, both types being present on the three-dimensional object 16. In this example, there is a range of Z-values identified by the numeral 92 wherein the near flat down-facing surface type 90 exclusively resides, and there is a range of Z-values identified by the numeral 94 wherein the near flat down-facing surface type 90 and the trapped volume type 88 overlap. There is also a range of Z-values identified by the numeral 96 wherein the trapped volume type 88 exclusively resides. Referring now to FIG. 9B, there is a first column (General Default) indicating the parameters associated with the general build style for the object, a second column (Near Flat Default) for the near flat down-facing surface type parameters, and a third column (Trapped Volume Default) for the trapped volume type parameters.

TABLE 2

| Parameter | Style File | General Default | Near Flat Default | Trapped Volume Default | Correct Value to Use for Zrange1 | Correct Value to Use for Zrange2 | Correct Value to Use for Zrange3 |
|---|---|---|---|---|---|---|---|
| # Additional Boundaries | STY | 1 | 2 | | 2 | 2 | 1 |
| Border OC | STY | 0.007 | 0.010 | | 0.010 | 0.010 | 0.007 |
| Hatch OC | STY | −0.001 | −0.001 | | −0.001 | −0.001 | −0.001 |
| Fill CD | STY | 0.007 | 0.009 | | 0.009 | 0.009 | 0.007 |
| Sweep V | RCS | 2 | | 1 | 2 | 1 | 1 |
| Zwait | RCS | 10 | | 30 | 10 | 30 | 30 |

In Table 2, the most conservative parameters are selected for the example shown in FIG. 9, where conflicting parameters are present having different values for the same parameter type from two or more special build types, as previously discussed and shown in the embodiment of FIG. 5. Referring now to the first range of Z-values 92, it can be seen in the column (Zrange1) that the values for the border overcure parameter (Border OC), the hatch overcure parameter (hatch OC), and the fill parameter (Fill CD) from the near flat down-facing surface type (Near Flat Default) are used. These values are more conservative than the values for these parameters for the general build style and are therefore used. However, because the alternative parameters of the near flat down-facing surface type have no values for the sweep velocity parameter (Sweep V), and the Z-wait parameter (Zwait), the values from the general build style for these parameters are used in the first range of Z-values 92. Referring now to the second range of Z-values 94, both the trapped volume type 88 and the near flat down-facing surface type 90 both reside. As can been seen in Table 2, the values from the near flat down-facing surface type for the border overcure parameter (Border OC), hatch overcure parameter (Hatch OC), and fill parameter (Fill CD) are used in the column (Zrange2) associated with the second range of Z-values 94. This is because these values are more conservative than the values of the conflicting parameters found in the general build style. However, the values from the trapped volume type for the parameters of sweep velocity (Sweep V) and Z-wait (Zwait) are used in column (Zrange2) because they are more conservative than the values of the corresponding parameter value from the general build style. Referring now to the third range of the values 96, the column (Zrange3) shows a combination of the values of the parameters from the general build style are combined with the more conservative values of the trapped volume type for sweep velocity and Z-wait. This is the preferred embodiment since values for individual parameters may be matched across different general build style parameters and special build type parameters in order to develop a custom set of parameters to form the layers within a range of Z-values of the three-dimensional part.

TABLE 3

| Parameter | Style File | General Default | Trapped Volume Default | Delicate Feature Default | Correct Value to Use for Zrange1 | Correct Value to Use for Zrange2 |
|---|---|---|---|---|---|---|
| # Additional Boundaries | STY | 1 | | | 1 | 1 |
| Border OC | STY | 0.007 | | | 0.007 | 0.007 |
| Hatch OC | STY | −0.001 | | | −0.001 | −0.001 |
| Fill CD | STY | 0.007 | | | 0.007 | 0.007 |
| SweepV | RCS | 2 | 1 | 0.5 | 2 | 0.5 |
| Zwait | RCS | 10 | 30 | 10 | 10 | 30 |

Figure 10A:
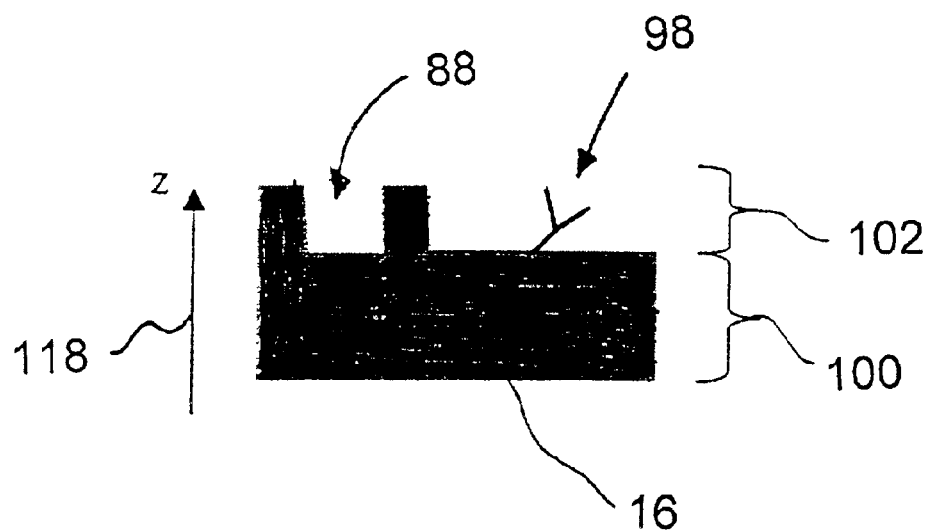
FIGS. 10A and 10B depict another example where two special build types are present within the same range of Z-values on a three-dimensional object to be formed.
Figure 10B:
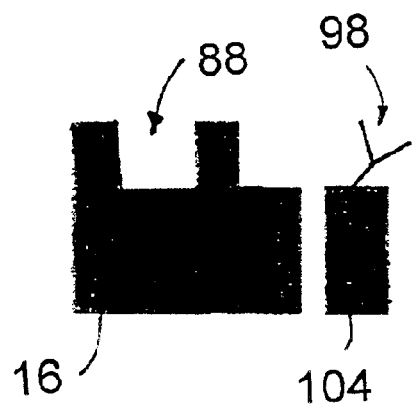

Referring now for illustration purposes to the examples shown in FIGS. 10A and 10B in conjunction with Table 3 above, another condition is shown where more than one special build type overlaps within a range of Z-values and the most conservative alternative parameters are selected from the two special build types. Referring to FIG. 10A, the three-dimensional object 16 has a trapped volume type 88 and a delicate feature type 98, residing within a range of Z-values identified by the numeral 102. Referring to Table 3, because there are no special build types within the range of Z-values identified by the numeral 100, the values of the parameters for the general build style are used to form the layers of the three-dimensional object 16 within the range of Z-values 100. For the range of Z-values identified by the numeral 102, the general build style default parameters are used where there are no alternative values identified in the trapped volume or delicate feature special build types. However, both the trapped volume type and delicate feature type have different values for the sweep velocity parameter and the Z-wait parameter. Here the most conservative value is selected from the values provided in the two special build types. With respect to the sweep velocity parameter, the lower value is selected because it will produce a slower sweep velocity and is, therefore, a more conservative value. With respect to the Z-wait parameter, a higher value indicates a longer wait period between sweeps of the re-coating device and is therefore a more conservative value. As can been seen in the column (Zrange2) corresponding to the second range of Z-values 102, the most conservative value for the sweep velocity (0.5) is selected from the delicate features type default and the most conservative value for the Z-wait parameter (30) is selected from the trapped volume type default. Again, this is an example of the preferred embodiment shown in FIG. 5, wherein values from conflicting parameters from two or more special build types and/or with the general build style can be mixed and matched.

It is to be appreciated that the same set of build parameters shown in Table 3 would be used even for the geometric configuration shown in FIG. 10B where the delicate feature type 98 resides on a separate three-dimensional object identified by the numeral 104. This illustrates another unique feature of the present invention, that multiple objects can be created simultaneously for a given stereolithography build process where the objects have more than one special build type present within a common range of Z-values. This is unique since the special build types need not reside on the same three-dimensional object but may reside on any object within the range of Z-values. Such build flexibility is nonexistent in current stereolithography systems.

TABLE 4

| Parameter | Style File | General Default | Trapped Volume Default | Delicate Feature Default | Correct Value to Use for Zrange1 | Correct Value to Use for Zrange2 |
|---|---|---|---|---|---|---|
| # Additional Boundaries | STY | 1 | | | 1 | 1 |
| Border OC | STY | 0.007 | | | 0.007 | 0.007 |
| Hatch OC | STY | −0.001 | | | −0.001 | −0.001 |
| Fill CD | STY | 0.007 | | | 0.007 | 0.007 |
| Sweep V | RCS | 2 | 1 | 0.5 | 2 | 1 |
| Zwait | RCS | 10 | 30 | 10 | 10 | 30 |

Figure 11:
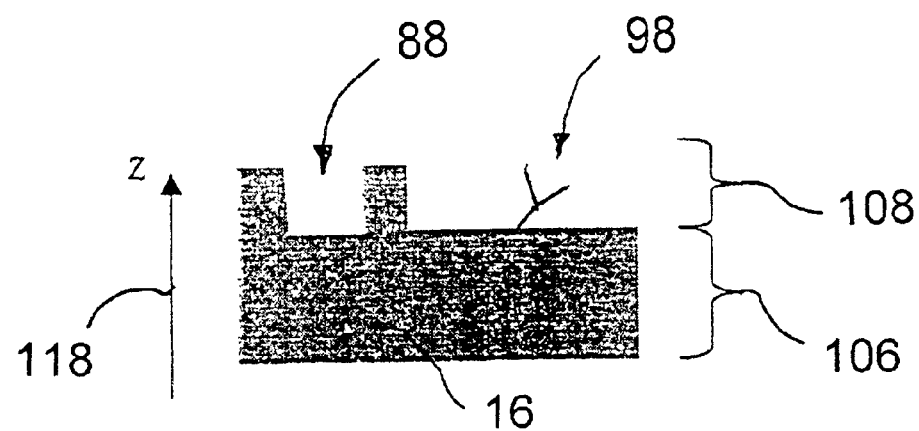
FIG. 11 depicts another example where two special build types are present within the same range of Z-values on a three-dimensional object to be formed.

Referring to the example shown in FIG. 11 in conjunction with Table 4, a special build type hierarchy is relied upon to select the parameters from one of the two or more special build types when present within the same range of Z-values. This example illustrates the capability of the fourth embodiment shown in FIG. 6. Referring to FIG. 11, the three-dimensional object 16 has a trapped volume type 88 and a delicate feature type 98 that both reside within a second range of Z-values (Zrange2) identified by the numeral 108. For the first range of Z-values (Zrange1) shown in Table 4 and identified by the numeral 106 in FIG. 11, the values of the parameters associated with the general build style for the object are used. It is noted that the values of the parameters for the sweep velocity (Sweep V) and Z-wait (Zwait) are different for the trapped volume type and delicate feature type. Assuming the special build type hierarchy prefers trapped volume types over delicate feature types, the values of the parameters for the trapped volume type will be used when both types are present within a given range of Z-values. As shown in Table 4, the values of the parameters for sweep velocity and Z-wait from the trapped volume for the second range of Z-values (Zrange2) are selected and used with the remaining default parameters from the general build style in this example.

TABLE 5

| Parameter | Style File | General Default | Trapped Volume Default | Delicate Feature Default | Correct Value to Use for Zrange1 | Correct Value to Use for Zrange2 |
|---|---|---|---|---|---|---|
| # Additional Boundaries | STY | 1 | | | 1 | 1 |
| Border OC | STY | 0.007 | | | 0.007 | 0.007 |
| Hatch OC | STY | −0.001 | | | −0.001 | −0.001 |
| Fill CD | STY | 0.007 | | | 0.007 | 0.007 |
| Sweep V | RCS | 2 | 2 | 0.5 | 2 | 0.5 |
| Zwait | RCS | 10 | 30 | 10 | 10 | 10 |

Figure 12:
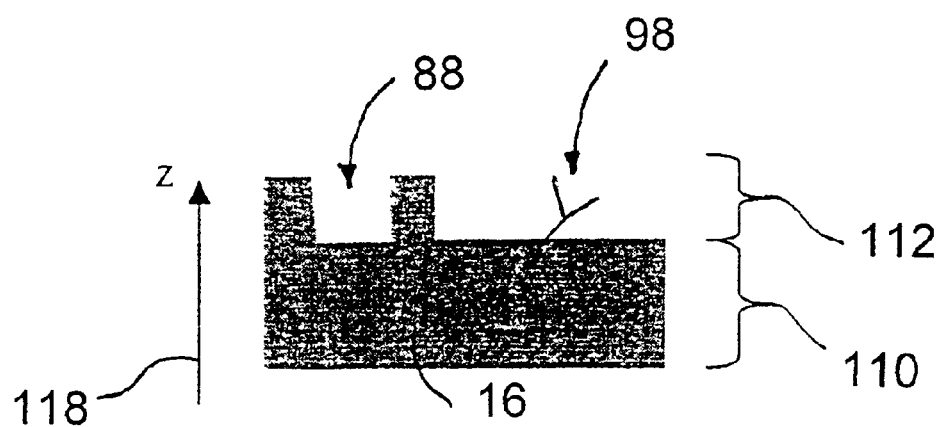
FIG. 12 depicts yet another example where two special build types are present within the same range of Z-values on a three-dimensional object to be formed.

Referring for purposes of illustration to the example shown in FIG. 12 in conjunction with Table 5, a special parameter hierarchy is relied upon to make the determination of which build type parameters are to be used when two or more special build types are present within the same range Z-values. In FIG. 12 the three-dimensional object 16 again has a trapped volume type 88 and delicate feature type 98 residing within a second range of Z-values, identified by the numeral 112. As can be seen in Table 5, the values of the parameters for sweep velocity and Z-wait are different for the trapped volume type and delicate feature type. Now for purposes of this example, it is assumed that a change in the sweep velocity parameter by one of the special build types has precedence over a change in the Z-wait parameter value, the change being compared to the value of parameters in the general build style. This assumption represents the special parameter hierarchy in this example. Referring to Table 5, it can be seen that the value for sweep velocity for the trapped volume type does not alter the value found for the general build style. However, the value of the sweep velocity for the delicate feature type does alter the value of the sweep velocity parameter of the general build style, making the sweep velocity parameter the highest priority parameter change. Because the highest priority parameter change is associated with the delicate feature type, the values of the parameters of the delicate feature type are selected for building the object in the second range of Z-values identified by the numeral 112. This is illustrated in the last column (Zrange2) of Table 5 which also shows that the parameters from the general build style not altered by the delicate feature type are used along with the values of the parameters for the delicate feature type.

TABLE 6

| Parameter | Style File | General Default | Trapped Volume Default | Delicate Feature Default | Correct Value to Use for Zrange1 | Correct Value to Use for Zrange2 |
|---|---|---|---|---|---|---|
| # Additional Boundaries | STY | 1 | | | 1 | 1 |
| Border OC | STY | 0.007 | | | 0.007 | 0.007 |
| Hatch OC | STY | −0.001 | | | −0.001 | −0.001 |
| Fill CD | STY | 0.007 | | | 0.007 | 0.007 |
| Sweep V | RCS | 2 | 1 | 0.5 | 2 | 1 |
| Zwait | RCS | 10 | 30 | 10 | 10 | 30 |

TABLE 7

| Parameter | Style File | General Default | Trapped Volume Default | Delicate Feature Default | Correct Value to Use for Zrange1 | Correct Value to Use for Zrange2 |
|---|---|---|---|---|---|---|
| # Additional Boundaries | STY | 1 | | | 1 | 1 |
| Border OC | STY | 0.007 | | | 0.007 | 0.007 |
| Hatch OC | STY | −0.001 | | | −0.001 | −0.001 |
| Fill CD | STY | 0.007 | | | 0.007 | 0.007 |
| Sweep V | RCS | 2 | 1 | 0.5 | 2 | 0.5 |
| Zwait | RCS | 10 | 30 | 10 | 10 | 10 |

Figure 13:
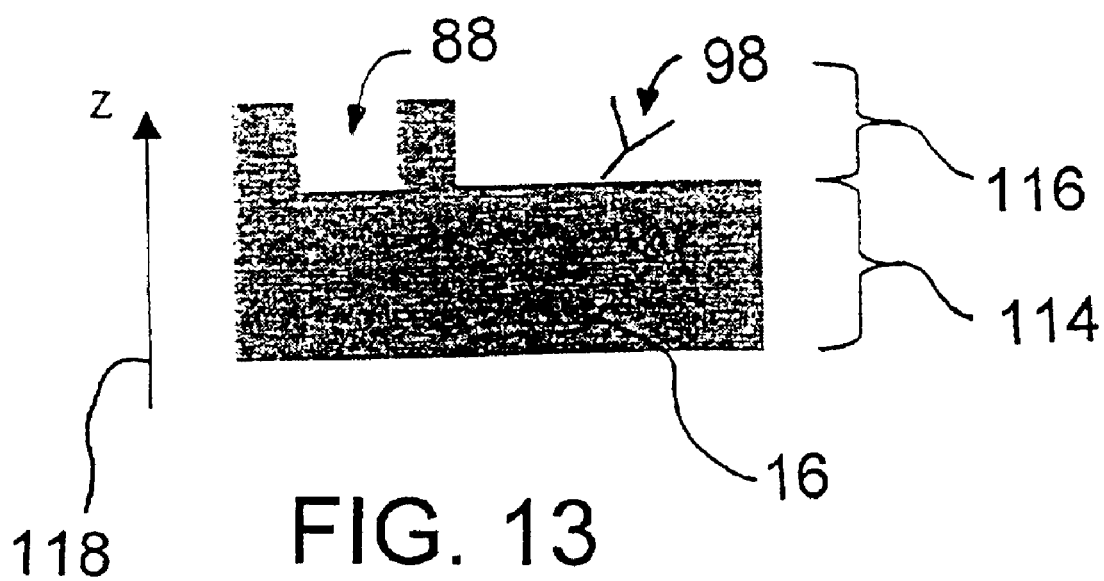
FIG. 13 depicts yet another example where two special build types are present within the same range of Z-values on a three-dimensional object to be formed.

Another example is shown for purposes of illustration in FIG. 13 which is essentially identical to the example shown in FIG. 12. However, in this example the two special build types both have a change for the highest priority parameter according to the special parameter hierarchy; however, Tables 6 and 7 show alternative solutions for this situation. Referring to FIG. 13, again a three-dimensional object 16 has a trapped volume type 88 and delicate feature type 98 located within the second range of Z-values indicated by the numeral 116. Again, it is assumed that the sweep velocity parameter is the most important parameter in the special parameter hierarchy. Shown in Tables 6 and 7, the trapped volume type and delicate feature type both show a change to the same highest priority parameter compared to the corresponding value found in the general build style, namely the sweep velocity parameter. In the example shown in Table 6, when the two or more special build types indicate a change to the same highest priority parameter on a special parameter hierarchy, the algorithm looks next to the second highest priority parameter change for consideration. Assuming for purposes of this example, the second highest priority parameter is the Z-wait parameter. Note that the value for the Z-wait parameter from the delicate feature type does not change the value of the parameter for the general build style.

However, the value of the Z-wait parameter from the trapped volume type does alter the value for the Z-wait parameter from the general build style. Therefore, in the example shown in Table 6, all the alternative parameters from the trapped volume type are combined with those of the general build style and are used to build the layers of the object 16 formed within the second range of Z-values 116.

In Table 7 an alternative variation to the special parameter hierarchy is shown.

In this example, the magnitude of the difference of the change in value of the highest priority parameter by the special build types determines which special build type parameters will be used. Again it is assumed the highest priority parameter of the special parameter hierarchy is the sweep velocity. The value for the sweep velocity from the delicate feature type is 0.5, is 1.0 for the trapped volume type, and is 2.0 for the general build style. Because the magnitude of difference between the value provided for the sweep velocity from the delicate feature type (1.5) is greater in magnitude than that between the trapped volume type (1.0), all the parameters from the delicate feature type are selected and combined with those of the general build style. This is shown in the last column in Table 7 and these values are used to form the trapped volume type 88 and delicate type 98, which reside within the second range of Z-values identified by numeral 116.

The present invention method is preferably to be used by a stereolithography apparatus, such as the SLA® 7000 system sold by 3D Systems of Valencia, Calif. However the present invention may be adapted for use in any SFF apparatus comprising a memory for storing a general build style, a memory for receiving data representing the three-dimensional object, a computer control system, a coating system, an exposure system, and a controller. Preferably the computer control system is programmed to process the general build style from the memory for storing the general build style, to process the data representing the three-dimensional object from the memory for receiving data, to orient the data representing the three-dimensional object in accordance with a Z-axis, to establish a span of Z-values for the data representing the three-dimensional object along the Z-axis, to identify at least one special build type comprising at least one alternative parameter within a range of Z-values of the span of Z-values associated with the data representing the three-dimensional object, and to produce object formation data. The coating system is preferably adapted to form a layer of the build material according to at least one of the alternative parameters from the special build type for the layers being formed within the range of Z-values and according to at least one of the parameters from the general build style for all other layers being formed. The exposure system is preferably adapted to selectively apply the prescribed stimulation to the layer according to at least one of the alternative parameters from the special build type for the layers being formed within the range of Z-values and according to at least one of the parameters from the general build style for all other layers being formed. The controller is preferably adapted to receive the object formation data from the computer control system in order to operate the coating system and the exposure system to form the layers of the three-dimensional object.

What has been described are preferred embodiments in which modifications and changes may be made without departing from the spirit and scope of the accompanying claims.

What is claimed is:

1. A solid freeform fabrication method of forming a three-dimensional object in a plurality of layers from a build material by exposing the layers to a prescribed stimulation, the method comprising:

determining a general build style for the object comprising a plurality of parameters;

providing data representing the three-dimensional object to be formed;

orienting the data in accordance with a Z-axis to establish a complete span of Z-values for the data;

identifying at least one special build type for at least one range of Z-values of the data of the three-dimensional object, the special build type comprising at least one alternative parameter;

forming the layer of the build material according to at least one of the alternative parameters from the special build type for layers being formed within the range of Z-values and according to at least one of the parameters from the general build style for all other layers being formed in the span of Z-values;

exposing the layer of build material to the prescribed stimulation according to at least one of the alternative parameters from the special build type for layers being formed within the range of Z-values and according to at least one of the parameters from the general build style for all other layers being formed in the span of Z-values; and, repeating the steps of forming and exposing the layers in order to form the three-dimensional object.

2. The method of claim 1 wherein the plurality of parameters of the general build style and the alternative parameters of the special build types are selected from any combination of re-coating parameters, exposure parameters, or support parameters.

3. The method of claim 1 wherein the plurality of parameters of the general build style and the alternative parameters of the special build types are selected from any combination of a group of parameters, the group of parameters consisting of the following parameter types: 1) layer thickness, 2) X&Y shrinkage compensation, 3) Z shrinkage compensation, 4) border overcure, 5) hatch overcure, 6) hatch type, 7) hatch spacing, 8) staggered weave, 9) alternate sequencing, 10) retraction: start, 11) retraction: end, 12) fill cure depth, 13) fill type, 14) fill spacing, 15) beam compensation on/off, 16) beam compensation value, 17) auto Z-correct, 18) additional boundaries, 19) multiple boundary offset, 20) Z-level wait, 21) pre-dip delay, 22) Z-dip velocity, 23) Z-dip distance, 24) number of sweeps, 25) gap percent, 26) sweep velocity, 27) support type, 28) minimum spacing between supports, 29) gusset angle, and 30) support height.

4. The method of claim 1 wherein the data representing the three-dimensional object is analyzed by a computer control system programmed to identify the special build type and the range of Z-values.

5. The method of claim 4 further comprising the step of slicing the data representing the three-dimensional object to be formed in a plurality of planes generally perpendicular to the Z-axis utilizing at least one of the parameters of the general build style to establish sliced object data, the step of slicing being accomplished by the computer control system.

6. The method of claim 4 wherein the computer control system determines the value of the alternative parameter of the special build type.

7. The method of claim 6 wherein the computer control system calculates the value of the alternative parameter of the special build type according to a linear relationship, a exponential relationship, or a logarithmic relationship.

8. The method of claim 4 wherein the alternative parameters of the special build types are selected from a library of special build types by the computer control system, the special build types being associated with at least one special geometric condition.

9. The method of claim 8 wherein the library of special build types comprises at least one parameter set, the parameter set being associated with the special geometric condition, the special geometric condition being either:
   a trapped volume type;
   a near flat down-facing surface type;
   a large flat up-facing surface type; or a delicate feature type.

10. The method of claim 9 wherein the library of special build types comprises at least one parameter set for the trapped volume type, at least one parameter set for the near flat down-facing surface type, at least one parameter set for the large flat area type, and at least one parameter set for the delicate feature type, and wherein at least one of all of the parameter sets are associated with the general build style.

11. The method of claim 8 wherein more than one special build type is identified within a range of Z-values of the span of Z-values associated with the data representing the three-dimensional object by the computer control system.

12. The method of claim 11 further comprises the steps of:
   comparing the parameter sets of the special build types identified within the same range of Z-values to determine, when present, at least two conflicting parameters among the parameter sets;
   selecting a most conservative value among the conflicting parameters and assigning the most conservative value selected to a composite special build type for the same range of Z-values in which the special build types are present, the most conservative value being the value selected that would take the longest time to form the three-dimensional object; and,
   forming the layers of build material within the range of Z-values and exposing the layers of build material within the range of Z-values to the prescribed stimulation, wherein at least one of the parameters from the composite special build type is utilized in either forming or exposing the layers of build material within the range of Z-values.

13. The method of claim 11 wherein a parameter set is associated with each special build type identified within the same range of Z-values, the method further comprises the step of:
   comparing the special build types identified within the same range of Z-values with a special build type hierarchy;
   selecting the parameter set from one of the at least two or more special build types within the same range of Z-values having the highest priority according to the special build type hierarchy;
   assigning the parameter set selected to the same range of Z-values in which the at least two or more special build types are present; and
   forming the layers of build material within the range of Z-values and exposing the layers of material within the range of Z-values to the prescribed stimulation, wherein at least one of the parameters from the parameter set selected according to the special build type hierarchy is utilized in either forming or exposing the layers of build material within the range of Z-values.

14. The method of claim 11 wherein a parameter set is associated with each special build type identified within the range of Z-values, the method further comprises the steps of:
   comparing the alternative parameters of the parameter sets of the two or more special build types identified within the same range of Z-values with the plurality of parameters of the general build style to determine the presence of corresponding parameters for each parameter set, the corresponding parameters being of a same parameter type present in the general build style;
   comparing the corresponding parameters for each parameter set to a special parameter hierarchy in order to determine a highest priority parameter change of one of the corresponding parameters;
   selecting the parameter set from the special build type for the range of Z-values of the corresponding parameter determined to have the highest priority parameter change; and
   forming the layers of build material within the range of Z-values and exposing the layers of build material within the range of Z-values to the prescribed stimulation, wherein at least one of the parameters from the parameter set selected having the highest priority parameter change is utilized in either forming or exposing the layers of build material within the range of Z-values.

15. The method of claim 14 wherein in the event the highest parameter change of the two or more parameter sets are the same, selecting the parameter set whose highest parameter change has a more conservative value among the parameter sets, the more conservative value being the value selected that would take the longest time to form the three-dimensional object.

16. The method of claim 14 wherein in the event the highest parameter change of the two or more parameter sets are the same, selecting the parameter set having a greater magnitude change in the value of the highest priority parameter change compared to the value of the same parameter type present in the general build style.

17. The method of claim 16 wherein in the event that the magnitude change in the value of the highest priority parameter change of the parameter sets are the same, repeating all of the steps with a next highest parameter change for each parameter set until one of the parameter sets is selected.

18. A solid freeform fabrication apparatus for forming a three-dimensional object from a plurality of layers from a build material by exposing the layers to a prescribed stimulation, comprising:
   a memory for storing a general build style having a plurality of parameters;
   a memory for receiving data representing the three-dimensional object;
   a computer control system programmed to:
      a) process the general build style from the memory for storing the general build style;
      b) process the data representing the three-dimensional object from the memory for receiving data;
      c) orient the data representing the three-dimensional object in accordance with a Z-axis;
      d) establish a span of Z-values for the data representing the three-dimensional object along the Z-axis;
      e) identify at least one special build type comprising at least one alternative parameter within a range of Z-values of the span of Z-values associated with the data representing the three-dimensional object; and
      f) produce object formation data;

a coating system for forming a layer of the build material according to at least one of the alternative parameters from the special build type for the layers being formed within the range of Z-values and according to at least one of the parameters from the general build style for all other layers being formed;

an exposure system for selectively applying the prescribed stimulation to the layer according to at least one of the alternative parameters from the special build type for the layers being formed within the range of Z-values and according to at least one of the parameters from the general build style for all other layers being formed; and a controller programmed to receive the object formation data from the computer control system in order to operate the coating system and the exposure system to form the layers of the three-dimensional object.

19. The apparatus of claim 18 wherein the computer control system determines the value of the alternative parameter of the special build style.

20. The apparatus of claim 19 wherein the computer control system calculates the value of the alternative parameter of the special build type according to a linear relationship, an exponential relationship, or a logarithmic relationship.

21. The apparatus of claim 18 wherein the computer control system is further programmed to slice the data representing the three-dimensional object to be formed in a plurality of planes generally perpendicular to the Z-axis utilizing at least one of the parameters of the general build style to establish sliced object data.

22. The apparatus of claim 18 further comprising:
a memory for storing a library of special build types wherein the computer control system selects the alternative parameters of the special build types from the library of special build types, the special build types being associated with at least one special geometric condition.

23. The apparatus of claim 22 wherein the library of special build types comprises at least one parameter set comprising the alternative parameter, the parameter set being associated with the special geometric condition, the special geometric condition being either:
a trapped volume type;
a near flat down-facing surface type;
a large flat up-facing surface type; or
a delicate feature type.

24. The apparatus of claim 23 wherein the memory for storing the general build style, the memory for receiving the data representing the three-dimensional object, and the memory for storing the library of special build types are part of the computer control system.

25. The apparatus of claim 23 wherein at least one of the parameter sets is associated with the trapped volume type, the near flat down-facing surface type, the large flat up-facing surface type, and the delicate feature type, wherein at least one of all of the parameter sets is associated with the general build style.

26. The apparatus of claim 18 wherein the computer control system is further programmed to identify more than one special build type within the range of Z-values of the data of the span of Z-values associated with the data representing the three-dimensional object.

27. The apparatus of claim 26 further comprising:
a memory for storing a plurality of parameter sets wherein at least one parameter set is associated with each of the more than one special build types identified within the same range of Z-values by the computer control system, wherein the computer control system is further programmed to:
a) compare the parameter sets of the special build types identified within the same range of Z-values to determine, when present, at least two conflicting parameters among the parameter sets;
b) select a most conservative value among the conflicting parameters and assign the most conservative value selected to a composite special build type for the same range of Z-values in which the special build types are present, the most conservative value being the value selected that would take the longest time to form the three-dimensional object; and,
c) produce the object formation data for the controller to:
1) operate the coating system to form the layers of build material within the same range of Z-values;
2) operate the exposing system to expose the layers of build material within the same range of Z-values to the prescribed stimulation; and
wherein at least one of the parameters from the composite special build type is utilized in either forming or exposing the layers of build material within the same range of Z-values.

28. The apparatus of claim 26 further comprising:
a memory for storing a plurality of parameter sets wherein at least one parameter set is associated with each of the more than one special build types identified within the same range of Z-values by the computer control system, wherein the computer control system is further programmed to:
a) compare the special build types identified within the same range of Z-values with a special build type hierarchy;
b) select the parameter set from one of the at least two or more special build types within the same range of Z-values having the highest priority according to the special build type hierarchy;
c) assign the parameter set selected to the same range of Z-values in which the at least two or more special build types are present; and
d) produce the object formation data for the controller to:
1) operate the coating system to form the layers of build material within the same range of Z-values;
2) operate the exposing system to expose the layers of build material within the same range of Z-values to the prescribed stimulation; and
wherein at least one of the parameters from the parameter set selected according to the special build type hierarchy is utilized in either forming or exposing the layers of build material within the range of Z-values.

29. The apparatus of claim 26 further comprising:
a memory for storing a plurality of parameter sets wherein at least one parameter set is associated with each of the more than one special build types identified within the same range of Z-values by the computer control system, wherein the computer control system is further programmed to:
a) compare the alternative parameters of the parameter sets of the two or more special build types identified within the same range of Z-values with the plurality of parameters of the general build style to determine the presence of corresponding parameters for each parameter set, the corresponding parameters being of a same parameter type present in the general build style;

b) compare the corresponding parameters for each parameter set to a special parameter hierarchy in order to determine a highest priority parameter change of one of the corresponding parameters;

c) select the parameter set from the special build type for the range of Z-values of the corresponding parameter determined to have the highest priority parameter change; and d) produce the object formation data for the controller to:

1) operate the coating system to form the layers of build material within the same range of Z-values;

2) operate the exposing system to expose the layers of build material within the same range of Z-values to the prescribed stimulation; and wherein at least one of the parameters from the parameter set selected having the highest priority parameter change is utilized in either forming or exposing the layers of build material within the range of Z-values.

\* \* \* \* \*